US012683652B2

(12) United States Patent (10) Patent No.: US 12,683,652 B2
Tsuchiya (45) Date of Patent: Jul. 14, 2026

(54) ANTENNA APPARATUS, SYSTEM, COMMUNICATION APPARATUS, AND PROGRAM

(71) Applicant: SoftBank Corp., Tokyo (JP)

(72) Inventor: Takahiro Tsuchiya, Tokyo (JP)

(73) Assignee: SoftBank Corp., Tokyo (JP)

( * ) Notice: Subject to any disclaimer, the term of this patent is extended or adjusted under 35 U.S.C. 154(b) by 325 days.

(21) Appl. No.: 18/595,447

(22) Filed: Mar. 5, 2024

(65) Prior Publication Data

US 2024/0204826 A1 Jun. 20, 2024

Related U.S. Application Data

(63) Continuation of application No. PCT/JP2022/036398, filed on Sep. 29, 2022.

(30) Foreign Application Priority Data

Sep. 30, 2021 (JP) ................................. 2021-162207
Feb. 4, 2022 (JP) ................................. 2022-016376

(51) Int. Cl.
H04B 7/0404 (2017.01)
H01Q 1/32 (2006.01)
(Continued)

(52) U.S. Cl.
CPC ............. H04B 7/0404 (2013.01); H01Q 1/32 (2013.01); H01Q 21/06 (2013.01); H04B 7/145 (2013.01); H04B 7/0691 (2013.01); H04B 7/0874 (2013.01)

(58) Field of Classification Search
CPC ........ H04B 7/0404; H04B 7/145; H01Q 1/32; H01Q 21/06
See application file for complete search history.

(56) References Cited

U.S. PATENT DOCUMENTS

2019/0103663 A1* 4/2019 Ichinose ............ H01Q 21/0037
2020/0411962 A1* 12/2020 Lindmark .............. H01Q 1/246
(Continued)

FOREIGN PATENT DOCUMENTS

JP S5639754 U 4/1981
JP H10209936 A 8/1998
(Continued)

OTHER PUBLICATIONS

Akihito Kato et al. Technologies of Millimeter-wave Inter-vehicle Communications. Propagation Characteristics. Journal of the Communications Research Laboratory Dec. 2001 p. 97-106 vol. 47 No. 4.
(Continued)

*Primary Examiner* — David Bilodeau

(57) ABSTRACT

Provided is an antenna apparatus mounted on a movable object, the antenna apparatus including an antenna array including: a plurality of first antennas which are arranged by being shifted by a distance equivalent to an odd multiple of a half period of a maximum fluctuation period of a radio wave having a longest fluctuation period among a plurality of radio waves received from an antenna of a communication partner; and a plurality of second antennas which are respectively arranged by being shifted with respect to the plurality of first antennas by a distance equivalent to an odd multiple of a half period of a minimum fluctuation period of a radio wave having a shortest fluctuation period among the plurality of radio waves.

33 Claims, 33 Drawing Sheets

(51) Int. Cl.
  *H01Q 21/06* (2006.01)
  *H04B 7/06* (2006.01)
  *H04B 7/08* (2006.01)
  *H04B 7/145* (2006.01)

(56) References Cited

U.S. PATENT DOCUMENTS

| | | | | |
|---|---|---|---|---|
| 2021/0273345 A1* | 9/2021 | Moon | ..................... | H01Q 21/20 |
| 2023/0092173 A1* | 3/2023 | Baranski | ................. | H01Q 9/30 |
| | | | | 343/702 |
| 2024/0030585 A1* | 1/2024 | Tsuchiya | ................. | H01Q 1/32 |
| 2024/0283300 A1* | 8/2024 | Fujii | ....................... | H02J 50/90 |

FOREIGN PATENT DOCUMENTS

| | | | |
|---|---|---|---|
| JP | 2001036444 A | 2/2001 |
| JP | 2001284930 A | 10/2001 |
| JP | 2004048754 A | 2/2004 |
| JP | 2016208303 A | 12/2016 |
| JP | 2019009530 A | 1/2019 |
| KR | 20200046654 A | 5/2020 |
| KR | 20200056467 A | 5/2020 |
| KR | 20200076971 A | 6/2020 |

OTHER PUBLICATIONS

Akihito Kato et al. Propagation Characteristics of 60 GHz Millimeter Waves for ITS Inter—Vehicle Communications, IEICE Trans. Commun., Sep. 2001, vol. E84 B, No. 9.

Yoshio Karasawa Radiowave Propagation Fundamentals for Digital Mobile Communications, 5.4 Angular profile and spatial correlation characteristics pp. 97-99, 8.1 Various diversity and synthesis methods pp. 160-161, 8.3 Maximum ratio combining of correlated branch signals p. 173, Corona Publishing Co., Ltd., First Print of Second Edition, Mar. 2016.

International Search Report and Written Opinion (ISA/237) of the International Search Authority for International Patent Application No. PCT/JP2022/036398, mailed by the Japan Patent Office on Dec. 20, 2022.

Office Action issued for counterpart Korean Application 10-2024-7009190, issued by the Korean Intellectual Property Office on May 28, 2025.

Extended European Search Report for counterpart European Application No. 22876433.8, issued by the European Patent Office on Dec. 3, 2024.

Ismail T H et al., Null steering in phased arrays by controlling the element positions, IEEE Transactions on Antennas and Propagation, IEEE, USA, Nov. 1, 1991, vol. 39, No. 11, pp. 1561-1566, XP000234977, ISSN: 0018-926X, DOI: 10.1109/8.102769.

* cited by examiner $$(2j+1)/2 \times \lambda\, d/2|X_{ref0}-X_{TX0}|$$

$$(2k+1)/2 \times \lambda\, d/2|Y_{ref0}-Y_{TX0}|$$

ANTENNA APPARATUS, SYSTEM, COMMUNICATION APPARATUS, AND PROGRAM

The contents of the following patent application(s) are incorporated herein by reference:

NO. 2021-162207 filed in JP on Sep. 30, 2021
NO. 2022-016376 filed in JP on Feb. 4, 2022
NO. PCT/JP2022/036398 filed in WO on Sep. 29, 2022

BACKGROUND

1. Technical Field

The present invention relates to an antenna apparatus, a system, a communication apparatus, and a program.

2. Related Art

Non-Patent Documents 1 and 2 describe effectiveness of a spatial diversity in vehicle-to-vehicle communication. Non-Patent Document 3 describes that antenna spacing for spatial diversity is based on non-line-of-sight communication and that it suffices to have a spacing of a half wavelength or more on a mobile station side and a spacing of 10 wavelengths or more on a base station side.

PRIOR ART DOCUMENT

Non-Patent Document

Non-Patent Document 1: Akihito Kato, Katsuyoshi Sato, Masayuki Fujise, "Technologies of Millimeter-wave Inter-vehicle Communications—Propagation Characteristics—", Review of the Communications Research Laboratory, vol. 47, no. 4, December 2001
Non-Patent Document 2: Akihito Kato, et al., "Propagation Characteristics of 60-GHz Millimeter Waves for ITS Inter-Vehicle Communications", IEICE TRANS. COMMUN., VOL. E84-B, NO. 9 Sep. 2001
Non-Patent Document 3: Yoshio Karasawa, "Radiowave Propagation Fundamentals for Digital Mobile Communications" Corona Publishing Co., Ltd., First Print of Second Edition, March 2016

BRIEF DESCRIPTION OF THE DRAWINGS

FIG. 19 is an explanatory drawing for illustrating a distance between transmission antenna and reflector for a case where a reflector is a road surface, a side reflector, or the like.
FIG. 22 is an explanatory drawing for illustrating arrangement of a plurality of antennas 2412 in an antenna unit 2400.

DESCRIPTION OF EXEMPLARY EMBODIMENTS

Although it is shown that spatial diversity is effective in vehicle-to-vehicle communication (Non-Patent Document 1), there is no mention of an optimal antenna array configuration method. It is described that antenna spacing for spatial diversity in mobile communication is based on non-line-of-sight communication in general and that it suffices to have a spacing of a half wavelength or more on a mobile station side and a spacing of 10 wavelengths or more on a base station side (Non-Patent Document 2).

The vehicle-to-vehicle communication is line-of-sight communication, but in a case of the line-of-sight communication, a level may periodically fluctuate in vertical and horizontal directions within a flat surface perpendicular to a road surface where a reception point is located, due to interference of a road surface reflected wave and a side reflected wave. It is necessary, in considering diversity, to optimize an antenna array configuration in consideration of periodicity of this fluctuation, but in an environment of being sandwiched, such as a space between a road surface and a roof surface of a bridge or the like, or a space between left and right side reflectors, a plurality of reflected waves are received together, so all antennas used for the diversity may become a null point. Therefore, it is necessary to take this into consideration. A system 10 according to the present embodiment has an antenna array configuration suitable for the line-of-sight communication such as the vehicle-to-vehicle communication.

Hereinafter, the present invention will be described through embodiments of the invention, but the following embodiments do not limit the invention according to claims. In addition, not all of the combinations of features described in the embodiments are essential to the solution of the invention.

Figure 1:
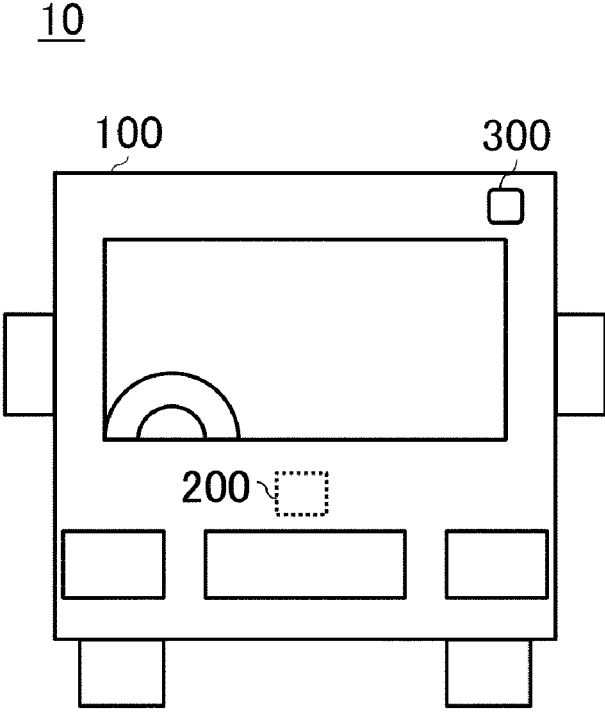
FIG. 1 schematically shows an example of a system 10.
Figure 2:
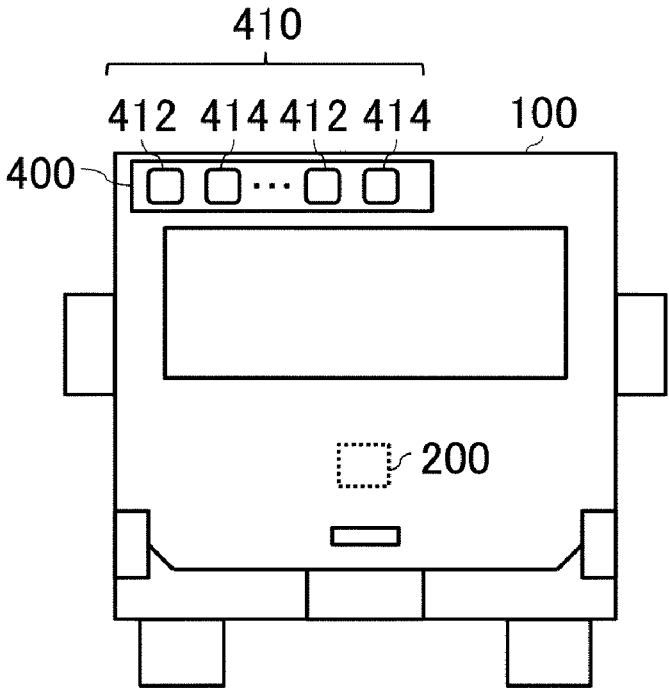
FIG. 2 schematically shows an example of a system 10.

FIG. 1 and FIG. 2 schematically show an example of a system 10 according to the present embodiment. The system 10 includes a communication apparatus 200, an antenna unit 400, and a movable object mounted with the communication apparatus 200 and the antenna unit 400. A vehicle 100 in FIG. 1 and FIG. 2 is an example of the movable object. The vehicle 100 may be an automobile.

FIG. 1 schematically shows a front of the vehicle 100, and FIG. 2 schematically shows a back of the vehicle 100. An antenna 300 is arranged on the front of the vehicle 100. The antenna unit 400 is arranged on the back of the vehicle 100.

The antenna unit 400 includes an antenna array. FIG. 2 illustrates a case where the antenna unit 400 has an antenna array 410 composed of a plurality of antennas 412 and a plurality of antennas 414. The antenna unit 400 may be an example of an antenna apparatus. The communication apparatus 200 including the antenna unit 400 may be an example of the antenna apparatus.

The communication apparatus 200 uses the antenna 300 and the antenna unit 400 to communicate with a communication apparatus 200 mounted on another vehicle 100 which is different from the vehicle 100 (which may be described as an own vehicle) mounted with the communication apparatus 200. For example, the communication apparatus 200 uses the antenna 300 to transmit data to another vehicle 100 travelling ahead of the own vehicle, and uses the antenna unit 400 to receive data from another vehicle 100 travelling behind the own vehicle. The antenna 300 may be a transmission antenna, and the antenna unit 400 may be a reception antenna unit.

Figure 3:
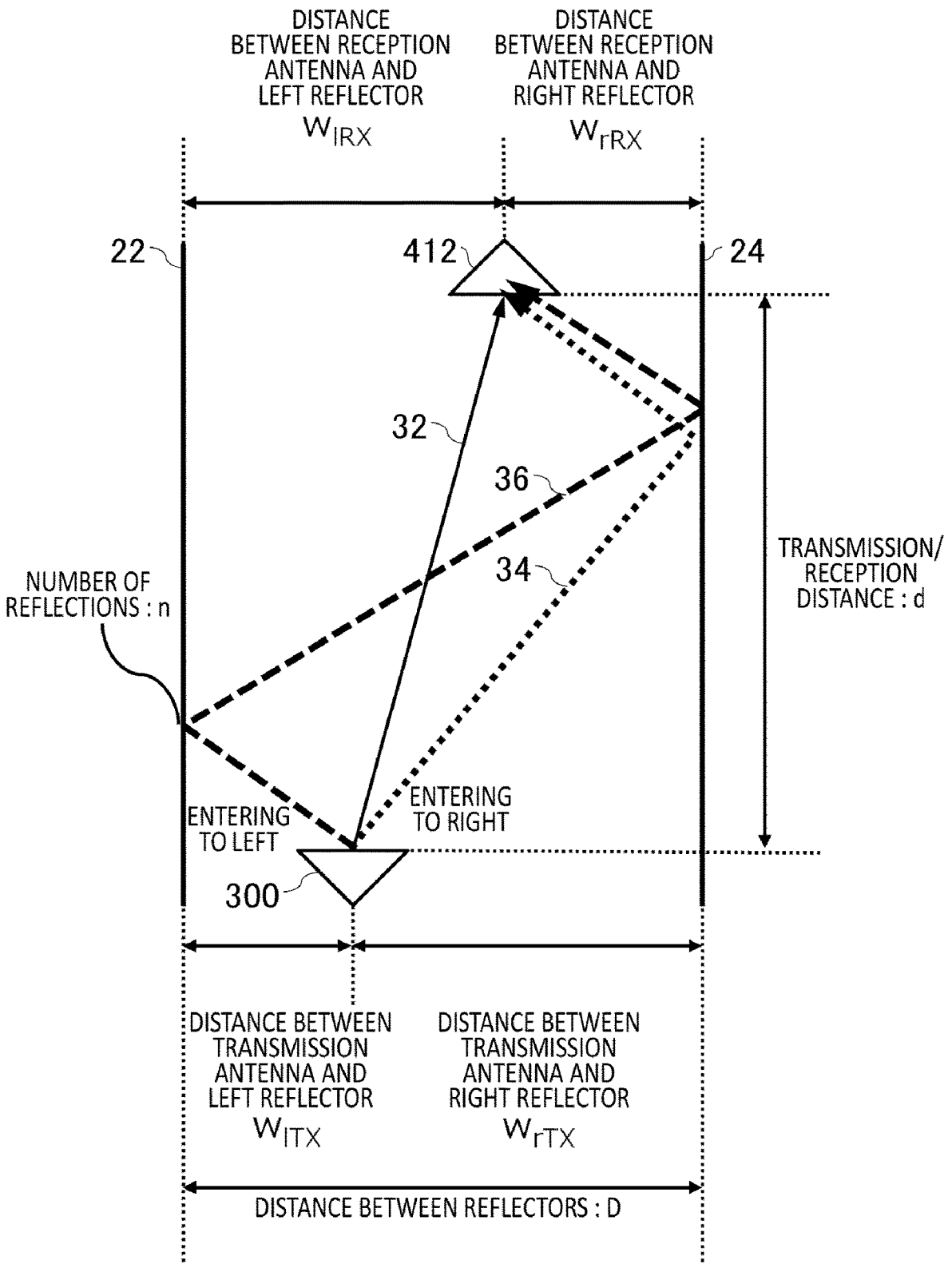
FIG. 3 schematically shows an example of an environment of an antenna 412 of an own vehicle and an antenna 300 of a communication partner.

FIG. 3 schematically shows an example of an environment of an antenna 412 of an own vehicle and an antenna 300 of a communication partner. In the example shown in FIG. 3, the own vehicle and the communication partner are located in an environment where they are sandwiched between a wall 22 and a wall 24.

In the present example, the antenna 412 receives a direct wave 32, a reflected wave 34, and a reflected wave 36. Here, description will be made assuming that a transmission/reception distance between the antenna 412 and the antenna 300 is d, a distance between transmission antenna and left reflector as a distance between the antenna 300 and the wall 22 is $W_{lTX}$, a distance between transmission antenna and right reflector as a distance between the antenna 300 and the wall 24 is $W_{rTX}$, a distance between reception antenna and left reflector as a distance between the antenna 412 and the wall 22 is $W_{lRX}$, a distance between reception antenna and right reflector as a distance between the antenna 412 and the wall 24 is $W_{rRX}$, and a distance between reflectors as a distance between the wall 22 and the wall 24 is D.

A propagation distance $r_d$ of the direct wave can be calculated according to Expression 1 described below.

$$r_d = \sqrt{d^2 + (h_{TX} - h_{RX})^2 + (W_{lTX} - W_{lRX})^2} \qquad \text{(Expression 1)}$$

$h_{TX}$ represents a height of the antenna 300 from a ground, and $h_{RX}$ represents a height of the antenna 412 from the ground.

A radio wave distance $r_s$ of the reflected wave can be calculated according to Expression 2 described below.

$$r_s = \sqrt{d^2 + (h_{TX} - h_{RX})^2 + (\alpha + \beta + (n-1)D)^2} \qquad \text{(Expression 2)}$$

When the reflected wave enters to the right and the number of reflections n is an odd number, $\alpha=W_{rTX}$ and $\beta=W_{lRX}$. When the reflected wave enters to the right and the number of reflections n is an even number, $\alpha=W_{rTX}$ and $\beta=W_{lRX}$. When the reflected wave enters to the left and the number of reflections n is an odd number, $\alpha=W_{lTX}$ and $\beta=W_{lRX}$. When the reflected wave enters to the left and the number of reflections n is an even number, $\alpha=W_{lTX}$ and $\beta=W_{rRX}$.

A path difference $\Delta r_s$ between the direct wave and the reflected wave can be calculated according to Expression 3 described below.

$$\Delta r_s = \sqrt{d^2 + (h_{TX} - h_{RX})^2 + (W_{lTX} - W_{lRX})^2} - \qquad \text{(Expression 3)}$$
$$\sqrt{d^2 + (h_{TX} - h_{RX})^2 + (\alpha + \beta + (n-1)D)^2}$$

When Expression 3 is approximated by a generalized binomial theorem, it can be expressed as in Expression 4 described below.

$$\Delta r_s = d\left(1 + \frac{(h_{TX} - h_{RX})^2 + (w_{lTX} - w_{lRX})^2}{2d^2}\right) - \qquad \text{(Expression 4)}$$
$$d\left(1 + \frac{(h_{TX} - h_{RX})^2 + (\alpha + \beta + (n-1)D)^2}{2d^2}\right) =$$
$$\frac{(w_{lTX} - w_{lRX})^2 - (\alpha + \beta + (n-1)D^2}{2d}$$

When the reflected wave enters to the right and the number of reflections n is an odd number, a path difference $\Delta r_{s1}$ can be expressed as in Expression 5 described below.

$$\Delta r_{s1} = \frac{-2w_{rTX} - (n-1)D}{d} w_{rRX} + \frac{-2(n-1)Dw_{rTX} - (n-1)^2 D^2}{2d} \qquad \text{(Expression 5)}$$

When the reflected wave enters to the right and the number of reflections n is an even number, a path difference $\Delta r_{s2}$ can be expressed as in Expression 6 described below.

$$\Delta r_{s2} = \frac{-nD}{d} w_{rRX} + \frac{-2nDw_{rTX} - n^2 D^2}{2d} \qquad \text{(Expression 6)}$$

When the reflected wave enters to the left and the number of reflections n is an odd number, a path difference $\Delta r_{s3}$ can be expressed as in Expression 7 described below.

$$\Delta r_{s3} = \frac{-2w_{lTX} - (n-1)D}{d} w_{lRX} + \frac{-2(n-1)Dw_{lTX} - (n-1)^2 D^2}{2d} \qquad \text{(Expression 7)}$$

When the reflected wave enters to the left and the number of reflections n is an even number, a path difference $\Delta r_{s4}$ can be expressed as in Expression 8 described below.

$$\Delta r_{s4} = \frac{-nD}{d} w_{lRX} + \frac{-2nDw_{lTX} - n^2 D^2}{2d} \qquad \text{(Expression 8)}$$

When the path difference is converted to a phase difference, a first term of $W_{rRX}$ and $W_{lRX}$ becomes a fluctuation component and a second term thereof becomes a constant component, so a fluctuation period in a horizontal direction within a flat surface perpendicular to a road surface where a reception point is located can be expressed as in Expression 9 for $\Delta r_{s1}$, as in Expression 10 for $\Delta r_{s2}$, as in Expression 11 for $\Delta r_{s3}$, and as in Expression 12 for $\Delta r_{s4}$.

$$L_{S1} = \frac{\lambda d}{2w_{rTX} + (n-1)D} \qquad \text{(Expression 9)}$$

$$L_{S2} = \frac{\lambda d}{nD} \qquad \text{(Expression 10)}$$

$$L_{S3} = \frac{\lambda d}{2w_{lTX} + (n-1)D} \qquad \text{(Expression 11)}$$

$$L_{S4} = \frac{\lambda d}{nD} = L_{S2} \qquad \text{(Expression 12)}$$

Figure 4:
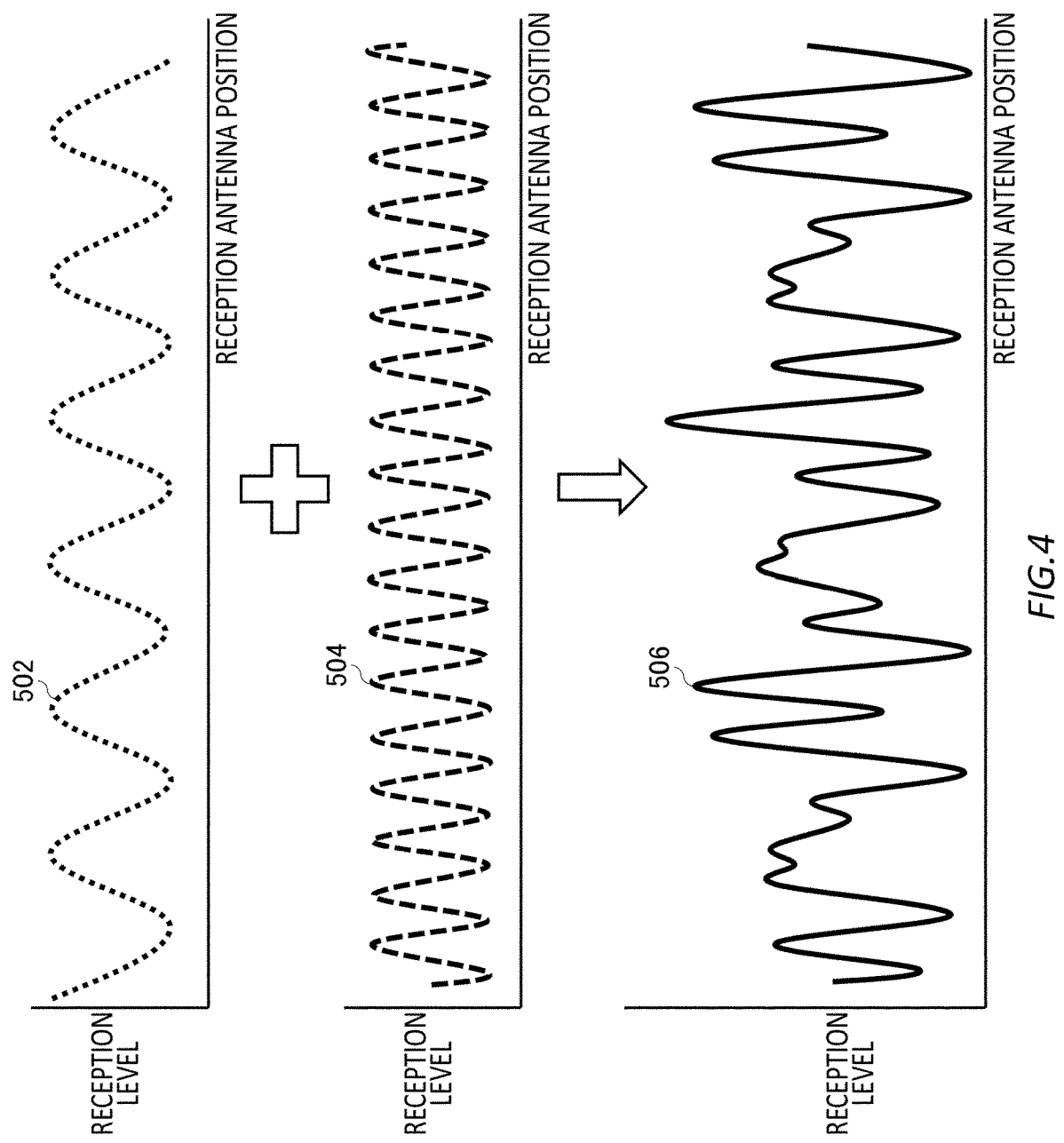
FIG. 4 schematically shows an example of a long period level fluctuation 502, a short period level fluctuation 504, and a combined wave level fluctuation 506.

FIG. 4 schematically shows an example of a long period level fluctuation 502, a short period level fluctuation 504, and a combined wave level fluctuation 506. The long period level fluctuation 502 indicates fluctuation in a reception level of a reflected wave 34 with respect to a reception antenna position. The short period level fluctuation 504 indicates fluctuation in a reception level of a reflected wave 36 with respect to the reception antenna position. The combined wave level fluctuation 506 indicates fluctuation in a reception level of a combined wave of the reflected wave 34 and the reflected wave 36 with respect to the reception antenna position. In an environment where an own vehicle and a communication partner are sandwiched between a plurality of reflectors as shown in FIG. 3, a plurality of reflected waves are received together as shown in FIG. 4.

Figure 5:
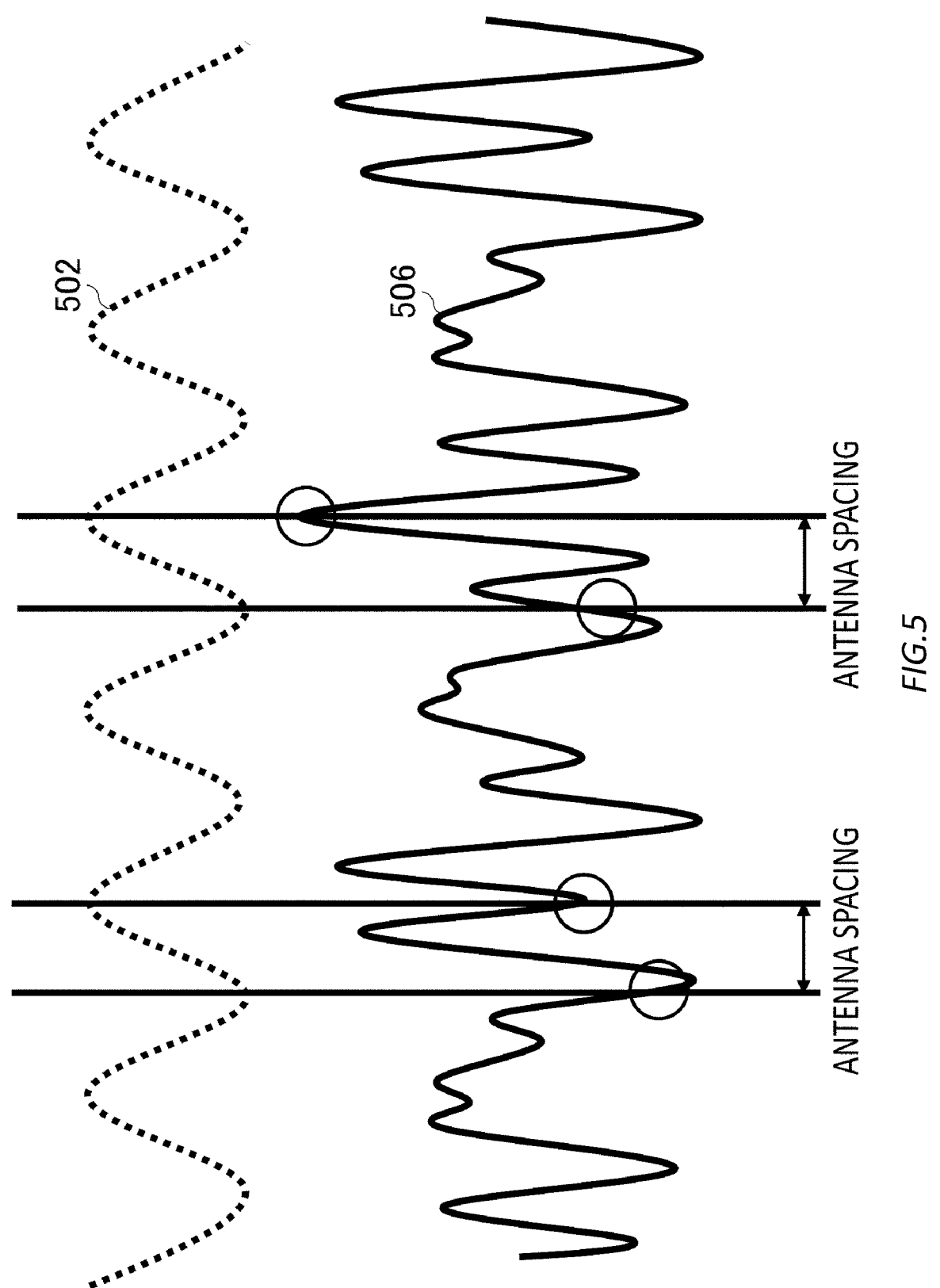
FIG. 5 is an explanatory drawing for illustrating a reception level of a combined wave level fluctuation 506 for a case where antennas 412 are arranged in accordance with a half period of a long period level fluctuation 502.

FIG. 5 is an explanatory drawing for illustrating a reception level of a combined wave level fluctuation 506 for a case where antennas 412 are arranged in accordance with a half period of a long period level fluctuation 502. When only a reflected wave 34 is a radio wave to be received, as illustrated in FIG. 5, it is possible to prevent all the antennas 412 from simultaneously becoming a null point by arranging the antennas 412 in accordance with the half period of the long period level fluctuation 502.

However, when a reflected wave 36 is received in addition to the reflected wave 34, all the antennas used for diversity may become the null point, or if not the null point, the reception level may become very low as illustrated in FIG. 5.

An antenna array 410 of an antenna unit 400 according to the present embodiment includes: a plurality of antennas 412 which are arranged by being shifted by a distance equivalent to an odd multiple of a half period of a maximum fluctuation period of a radio wave having a longest fluctuation period among a plurality of radio waves received from an antenna 300 of a communication partner; and a plurality of antennas 414 which are respectively arranged by being shifted with respect to the plurality of antennas 412 by a distance equivalent to an odd multiple of a half period of a minimum fluctuation period of a radio wave having a shortest fluctuation period among the plurality of radio waves. Including the plurality of antennas 414 in addition to the plurality of antennas 412 can prevent the null point or a low reception level point from being generated in a case of including only the plurality of antennas 412, and can reduce deterioration of a quality from a required quality.

For example, the plurality of antennas 412 are arranged by being shifted by the distance equivalent to the odd multiple of the half period of the maximum fluctuation period calculated from a minimum value for a distance between the antenna 300 of the communication partner and a reflector. For example, in the example shown in FIG. 3, the minimum value for the distance between the antenna 300 of the communication partner and the reflector is $W_{rTX}$.

For example, the plurality of antennas 414 are respectively arranged by being shifted with respect to the plurality of antennas 412 by the distance equivalent to the odd multiple of the half period of the minimum fluctuation period calculated from respective distances between the antenna 300 of the communication partner and two reflectors in an environment where an own vehicle and the communication partner are sandwiched between the two reflectors and from the number of reflections. For example, in the example shown in FIG. 3, they are arranged by being shifted by a distance equivalent to an odd multiple of a half period of a fluctuation period value which is the smallest of $L_{S1}$, $L_{S2}=L_{S4}$, and $L_{S3}$.

The plurality of antennas 412 and the plurality of antennas 414 may be arranged, for example, at intervals determined based on a maximum fluctuation period and a minimum fluctuation period assumed in an environment where a vehicle 100 is highly likely to be located. For example, for the vehicle 100 travelling on a highway relatively frequently, the intervals may be determined based on a maximum fluctuation period and a minimum fluctuation period for a case where reflection caused by side walls located on both sides is assumed. For example, for the vehicle 100 which travels in a residential area relatively frequently, the intervals may be determined based on a maximum fluctuation period and a minimum fluctuation period for a case where reflection caused by houses located on both sides is assumed.

Figure 6:
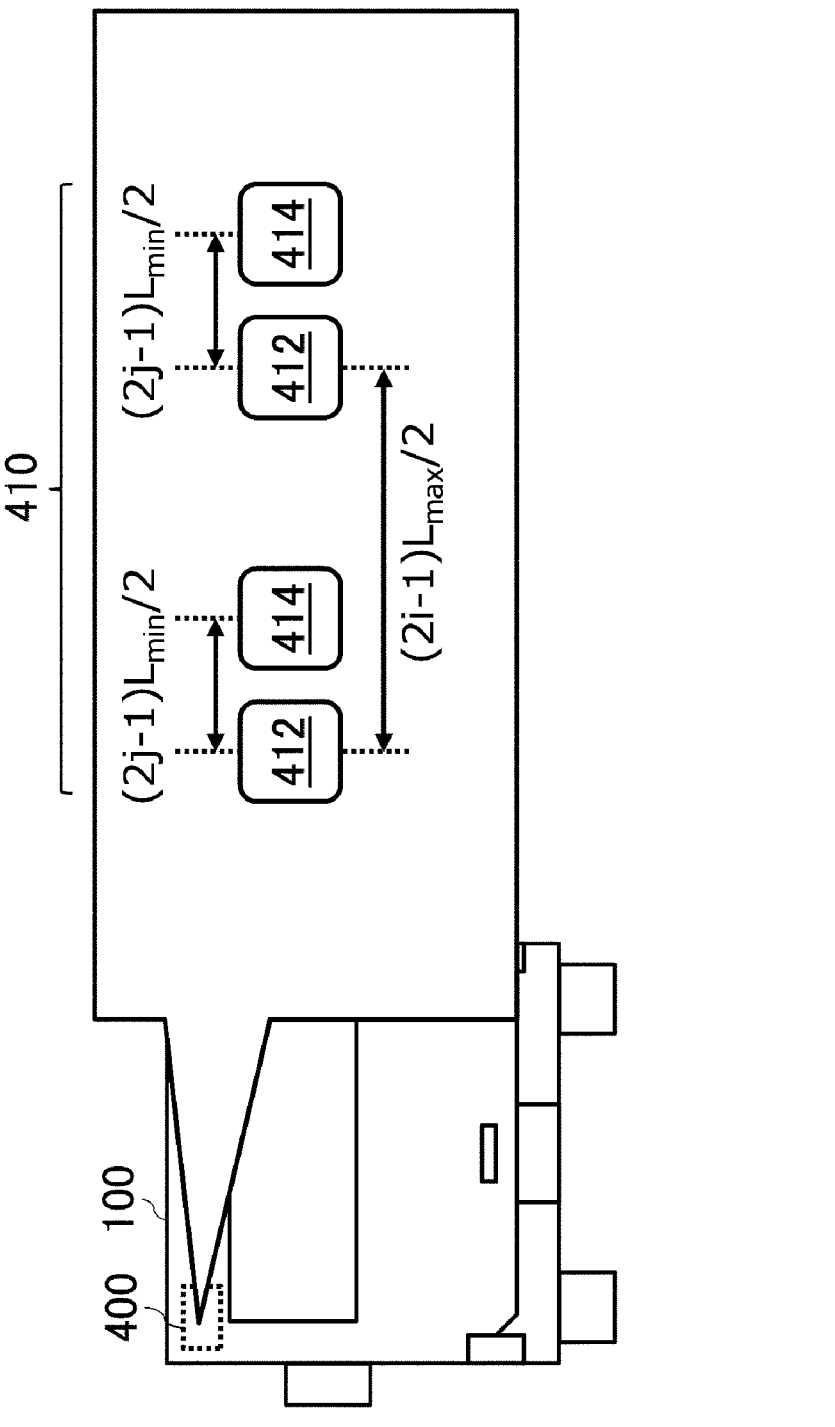
FIG. 6 schematically shows an example of a configuration of an antenna array 410.

FIG. 6 schematically shows an example of a configuration of an antenna array 410. A plurality of antennas 412 may be arranged by being shifted by a distance equivalent to an odd multiple of a half period of a maximum fluctuation period calculated from a minimum value for a distance between an antenna 300 of a communication partner and a reflector in an environment where a vehicle 100 and the communication partner are sandwiched between two reflectors located in a lateral direction. A plurality of antennas 414 may be respectively arranged by being shifted in a lateral direction with respect to the plurality of antennas 412 by a distance equivalent to an odd multiple of a half period of a minimum fluctuation period calculated from respective distances between the antenna 300 of the communication partner and the two reflectors located in the lateral direction in the environment where the vehicle 100 and the communication partner are sandwiched between the two reflectors and from the number of reflections. The expression "arranged by being shifted in a lateral direction" may mean "arranged by being shifted in a horizontal direction". An antenna 412 may be an example of a first antenna. An antenna 414 may be an example of a second antenna.

For example, the plurality of antennas 412 are arranged at an interval equivalent to an odd multiple of a half period of a maximum fluctuation period calculated from a minimum value for a distance between a main reflector and the antenna 300 of the communication partner, $L_{max}=(\lambda d)/(2\cdot[\text{the distance to the main reflector}])$, that is, $(2i-1)L_{max}/2$ ($i=1, 2, \ldots$). The distance to the main reflector may be a distance to a reflector having a shortest distance to the antenna 300 among a plurality of reflectors in an environment where the vehicle 100 is highly likely to be placed. $W_{lTX}$ in the example shown in FIG. 3 corresponds to the distance to the main reflector. FIG. 6 illustrates a case where the antenna array 410 includes two antennas 412.

For example, the plurality of antennas 414 are respectively arranged around the plurality of antennas 412 at an interval equivalent to an odd multiple of a half period of a minimum fluctuation period $L_{min}$ to be considered which is calculated from a distance between each reflector and the antenna 300 of the communication partner in the environment where the vehicle 100 and the communication partner are sandwiched between the two reflectors and from the number of reflections, that is, $\pm(2j-1)L_{min}/2$ ($j=1, 2, \ldots$). In the example shown in FIG. 3, $W_{lTX}$ and $W_{rTX}$ correspond to the distance between each reflector and the antenna 300 of the communication partner. $L_{min}$ may be a value which is the smallest of $L_{S1}$, $L_{S2}$ ($L_{S4}$), and $L_{S3}$ calculated according to Expression 9, Expression 10 (Expression 12), and Expression 11. FIG. 6 illustrates a case where the antenna array 410 includes two antennas 414.

The two reflectors in the lateral direction may be, for example, side walls installed on a road. The respective distances between the antenna 300 of the communication partner and the two reflectors may be distances corresponding to distances in a lateral direction between the antenna 300 of the communication partner and the two reflectors assumed when the communication partner travels on the road. The distances can be determined in advance by a legal distance requirement for the side walls installed on the road. For example, if it is legally determined that the side walls should be arranged at a position 3.5 m away from the road, the distances may be determined by 3.5 m, a position of the vehicle 100 on the road, and a position of an antenna on the vehicle 100. In addition, the distances can also be determined in advance through actual measurement at multiple locations. For example, the distances may be determined, for example, by actually measuring a distance between the antenna of the vehicle 100 and the reflector in an environment where the vehicle 100 travels and averaging values which have been actually measured.

The two reflectors in the lateral direction may be, for example, side vehicles which travel on a side of the vehicle 100 and the communication partner. A distance between the antenna 300 of the communication partner and a side vehicle may be a distance corresponding to a distance in a lateral direction between the antenna 300 of the communication partner and the side vehicle assumed when the side vehicle travels on the side of the communication partner. The distance can be determined in advance, for example, by a road width or through the actual measurement at multiple locations.

It should be noted that a value according to an assumed environment may be set as the number of reflections n. For example, a value determined on a basis of a distance between a reflector present in the assumed environment and the antenna 300 of the communication partner as well as a material of the reflector is set as the number of reflections n. As a specific example, when the assumed reflector is a side wall of the road, and the material is concrete, a reflected wave which has been reflected more than three times is expected to attenuate to the point that it does not affect a received radio wave, so 3 may be set as the number of reflections. For example, when the assumed reflector is the side wall of the road, but the material is an iron-like material which has less attenuation caused by a reflection than concrete, a number greater than 3 may be set as the number of reflections n. For example, when the material of the assumed reflector is concrete, but it is present at a position farther than the side wall of the road, a number smaller than 3 may be set as the number of reflections n.

Although FIG. 6 shows an example where both of the two antennas 414 are arranged in a right direction of the two antennas 412, a positional relationship between the two antennas 412 and the two antennas 414 is not limited thereto.

Figure 7:
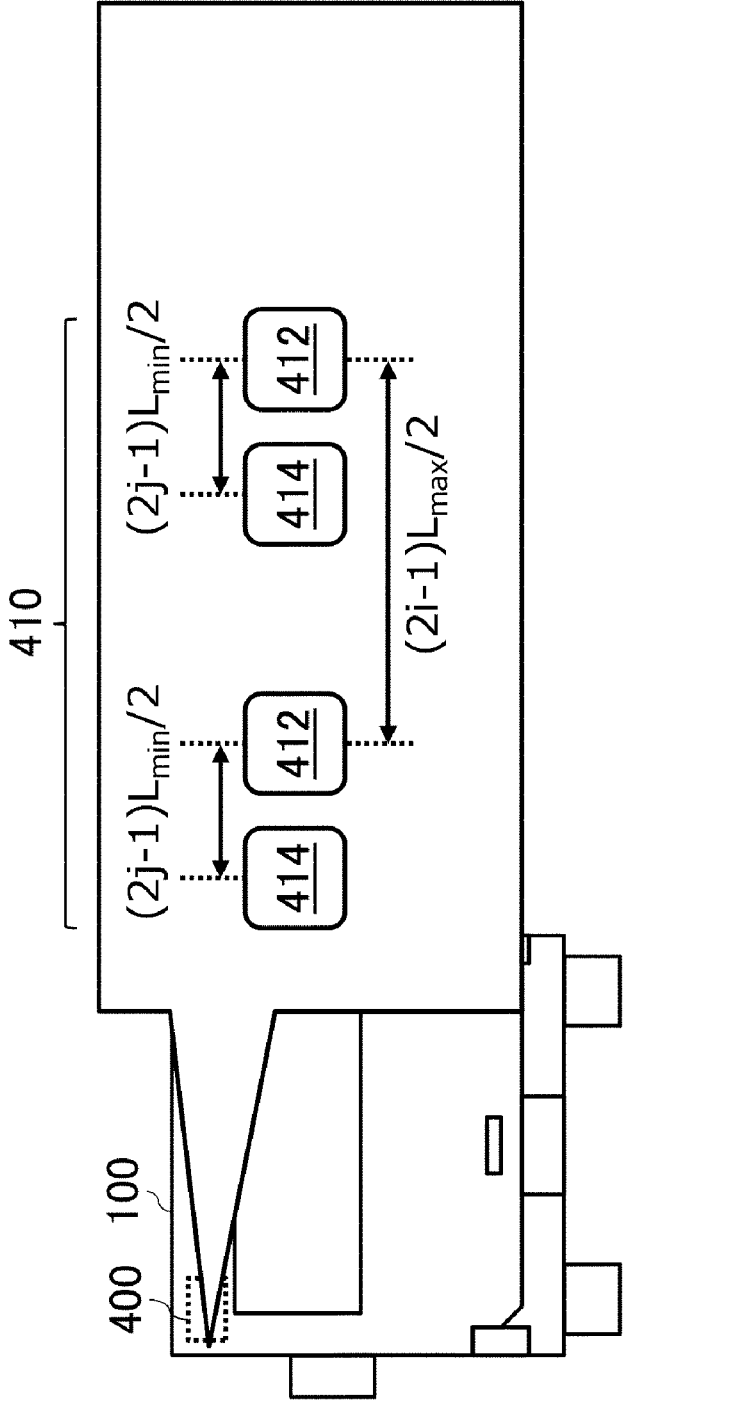
FIG. 7 schematically shows another example of a configuration of an antenna array 410.

FIG. 7 schematically shows another example of a configuration of an antenna array 410. In the example shown in FIG. 7, both of two antennas 414 are arranged in a left direction of two antennas 412.

Although FIG. 6 and FIG. 7 illustrate a case where the two antennas 414 are arranged by being shifted in the same direction with respect to the two antennas 412, the present invention is not limited thereto, and the two antennas 414 may be arranged by being shifted in different directions with respect to the two antennas 412.

Figure 8:
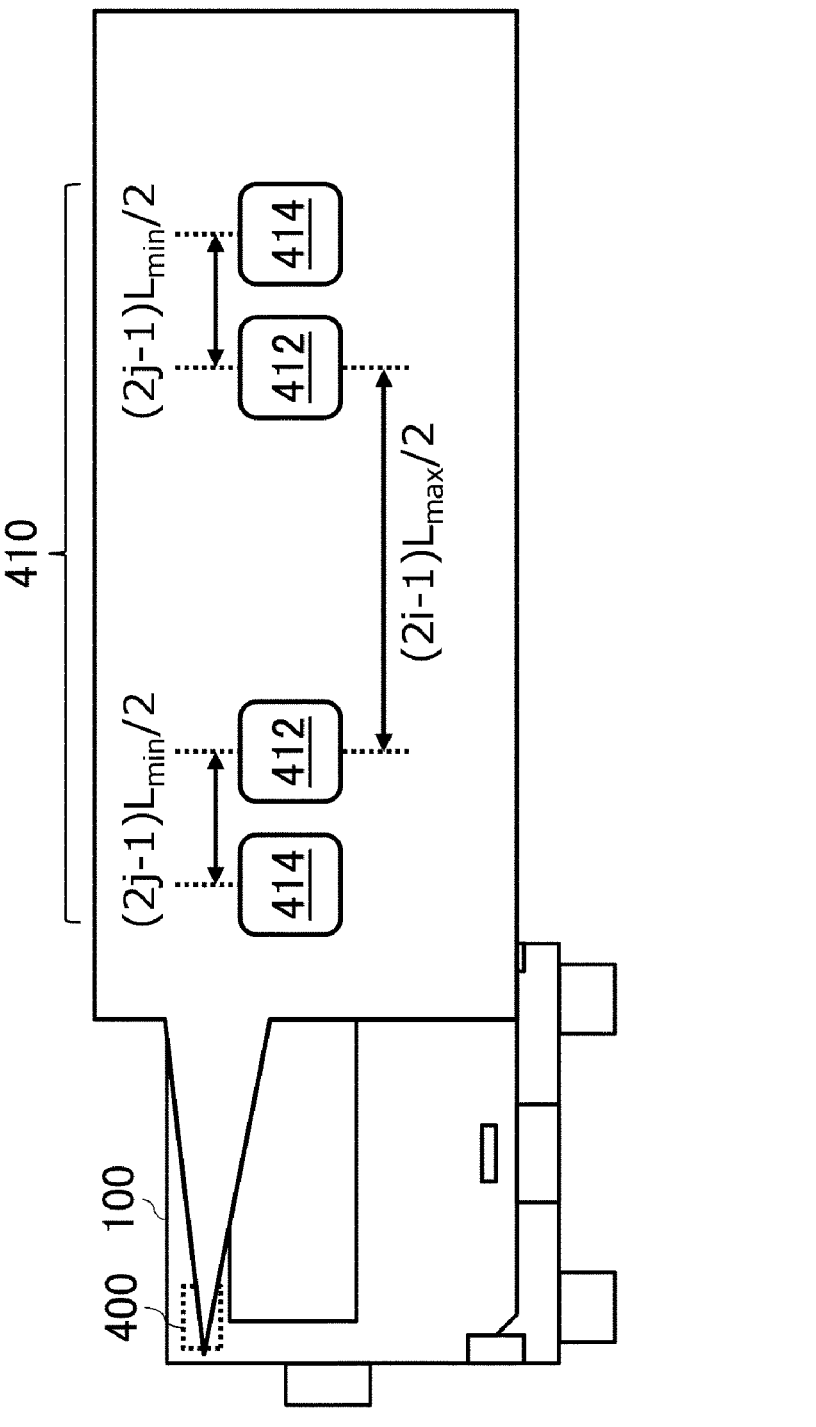
FIG. 8 schematically shows another example of a configuration of an antenna array 410.

FIG. 8 schematically shows another example of a configuration of an antenna array 410. In the example shown in FIG. 8, one of two antennas 414 is arranged on a left side of a left antenna 412 of two antennas 412, and another of the two antennas 414 is arranged on a right side of a right antenna 412 of the two antennas 412.

Figure 9:
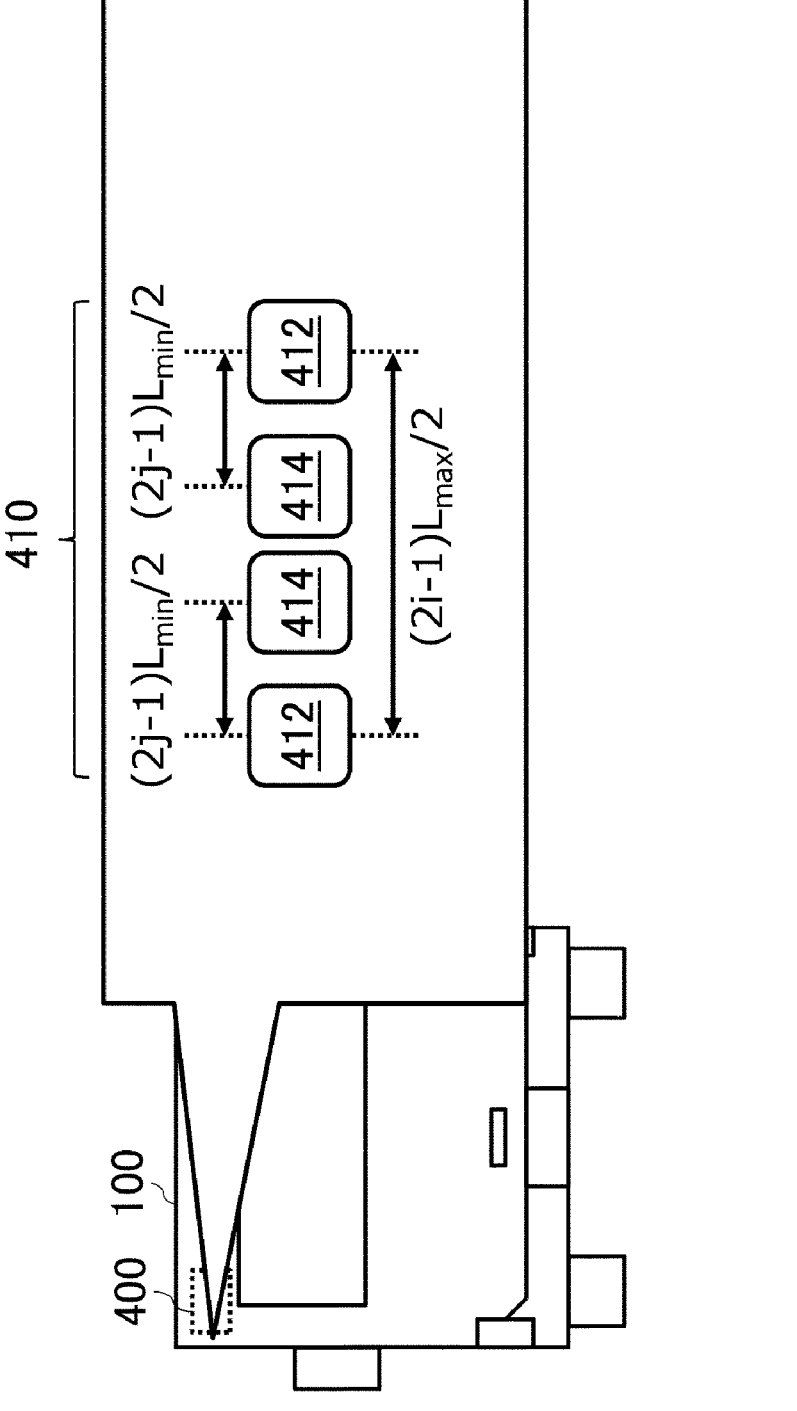
FIG. 9 schematically shows another example of a configuration of an antenna array 410.

FIG. 9 schematically shows another example of a configuration of an antenna array 410. In the example shown in FIG. 9, one of two antennas 414 is arranged on a right side of a left antenna 412 of two antennas 412, and another of the two antennas 414 is arranged on a left side of a right antenna 412 of the two antennas 412.

Although FIG. 6 to FIG. 9 illustrate a case where the two antennas 412 and the two antennas 414 are arranged by being shifted in a lateral direction, the present invention is not limited thereto. The two antennas 412 and the two antennas 414 may be arranged by being shifted in a longitudinal direction when an environment is assumed in which they are sandwiched between two reflectors in a longitudinal direction such as a road surface and a roof, or the like. The expression "arranged by being shifted in a longitudinal direction" may mean "arranged by being shifted in a height direction".

Figure 10:
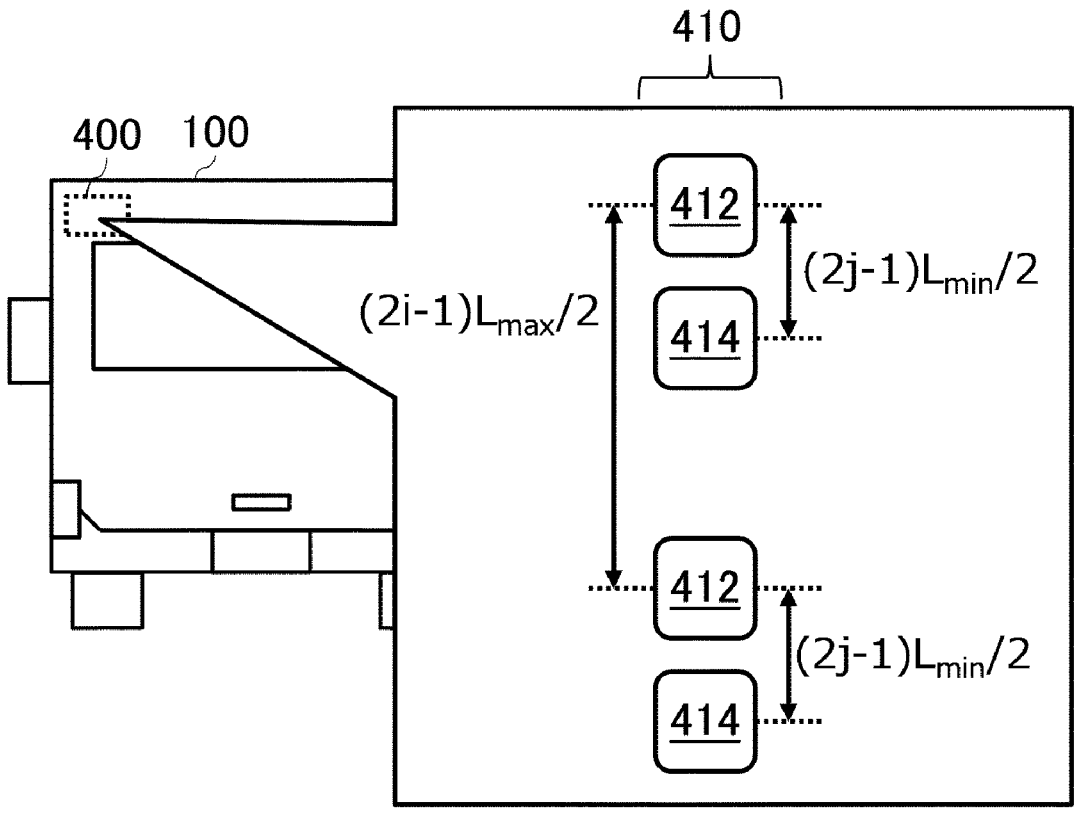
FIG. 10 schematically shows another example of a configuration of an antenna array 410.

FIG. 10 schematically shows another example of a configuration of an antenna array 410. A plurality of antennas 412 may be arranged by being shifted in a longitudinal direction by a distance equivalent to an odd multiple of a half period of a maximum fluctuation period calculated from a minimum value for a distance between an antenna 300 of a communication partner and a reflector in an environment where a vehicle 100 and the communication partner are sandwiched between two reflectors located in a longitudinal direction. A plurality of antennas 414 may be respectively arranged by being shifted in a longitudinal direction with respect to the plurality of antennas 412 by a distance equivalent to an odd multiple of a half period of a minimum fluctuation period calculated from respective distances between the antenna 300 of the communication partner and the two reflectors in the longitudinal direction in the environment where the vehicle 100 and the communication partner are sandwiched between the two reflectors located in the longitudinal direction and from the number of reflections.

For example, one of the two reflectors may be a road, and another of the two reflectors may be a roof of a tunnel. A distance between the antenna 300 of the communication partner and the road may be a distance corresponding to the distance between the antenna 300 of the communication partner and the road assumed when the communication partner travels on the road. The distance can be determined by an installation height of the antenna 300.

A distance between the antenna 300 of the communication partner and the roof may be a distance corresponding to the distance between the antenna 300 of the communication partner and the roof assumed when the communication partner travels in the tunnel. The distance can be determined by the installation height of the antenna 300 and a height of a roof surface of the tunnel.

In the example shown in FIG. 10, the plurality of antennas 412 are arranged by being shifted in a longitudinal direction at an interval of $(2i-1)L_{max}/2$. In addition, the plurality of antennas 414 are arranged by being shifted in a downward direction with respect to the antennas 412 at an interval of $\pm(2j-1)L_{min}/2$. FIG. 10 illustrates a case where the antenna array 410 includes two antennas 412 and two antennas 414.

Although FIG. 10 illustrates a case where the two antennas 414 are arranged by being shifted in a downward direction with respect to the two antennas 412, the present invention is not limited thereto, and the two antennas 414 may be arranged by being shifted in an upward direction with respect to the two antennas 412. In addition, the two antennas 414 may be arranged by being shifted in different directions with respect to the two antennas 412 instead of being arranged by being shifted in the same direction with respect to the two antennas 412.

Figure 11:
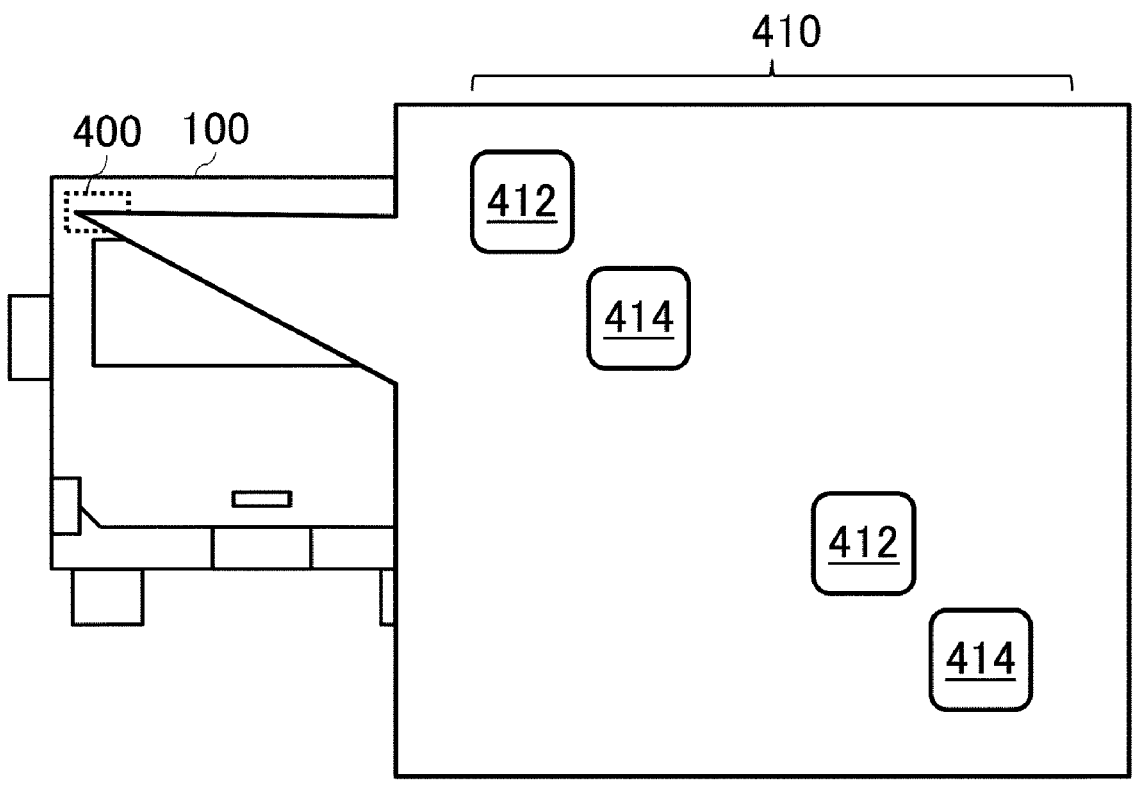
FIG. 11 schematically shows another example of a configuration of an antenna array 410.

FIG. 11 schematically shows another example of a configuration of an antenna array 410. FIG. 11 schematically shows an example of the configuration of the antenna array 410 for a case where an environment is assumed in which a vehicle 100 is sandwiched between two reflectors in a lateral direction and two reflectors in a longitudinal direction.

A plurality of antennas 412 may include two antennas 412 which are arranged by being shifted in a lateral direction by a distance equivalent to an odd multiple of a half period of a maximum fluctuation period calculated from a minimum value for distances between an antenna 300 of a communication partner and the two reflectors in the lateral direction and which are arranged by being shifted in a longitudinal direction by a distance equivalent to an odd multiple of a half period of a maximum fluctuation period calculated from a minimum value for distances between the antenna 300 of the communication partner and the two reflectors in the longitudinal direction. A plurality of antennas 414 may include two second antennas which are respectively arranged by being shifted in a lateral direction with respect to the two antennas 412 by a distance equivalent to an odd multiple of a half period of a minimum fluctuation period calculated from respective distances between the antenna 300 of the communication partner and the two reflectors in the lateral direction and from the number of reflections and which are respectively arranged by being shifted in a longitudinal direction with respect to the two antennas 412 by a distance equivalent to an odd multiple of a half period of a minimum fluctuation period calculated from respective distances between the antenna 300 of the communication partner and the two reflectors in the longitudinal direction and from the number of reflections.

In the example shown in FIG. 11, the two antennas 412 are arranged by being shifted in a lateral direction by a distance equivalent to an odd multiple of a half period of $L_{max}$ calculated from the minimum value for the distances between the antenna 300 of the communication partner and the two reflectors in the lateral direction, and are arranged by being shifted in a lateral direction by a distance equivalent to an odd multiple of a half period of $L_{max}$ calculated from the minimum value for the distances between the antenna 300 of the communication partner and the two reflectors in the longitudinal direction. In addition, two antennas 414 are respectively arranged by being shifted in a lateral direction with respect to the two antennas 412 by a distance equivalent to an odd multiple of a half period of a $L_{min}$ calculated from the respective distances between the antenna 300 of the communication partner and the two reflectors in the lateral direction and from the number of reflections, and are respectively arranged by being shifted in a longitudinal direction with respect to the two antennas 412 by a distance equivalent to an odd multiple of a half period of a $L_{min}$ calculated from the respective distances between the antenna 300 of the communication partner and the two reflectors in the longitudinal direction and from the number of reflections.

Figure 12:
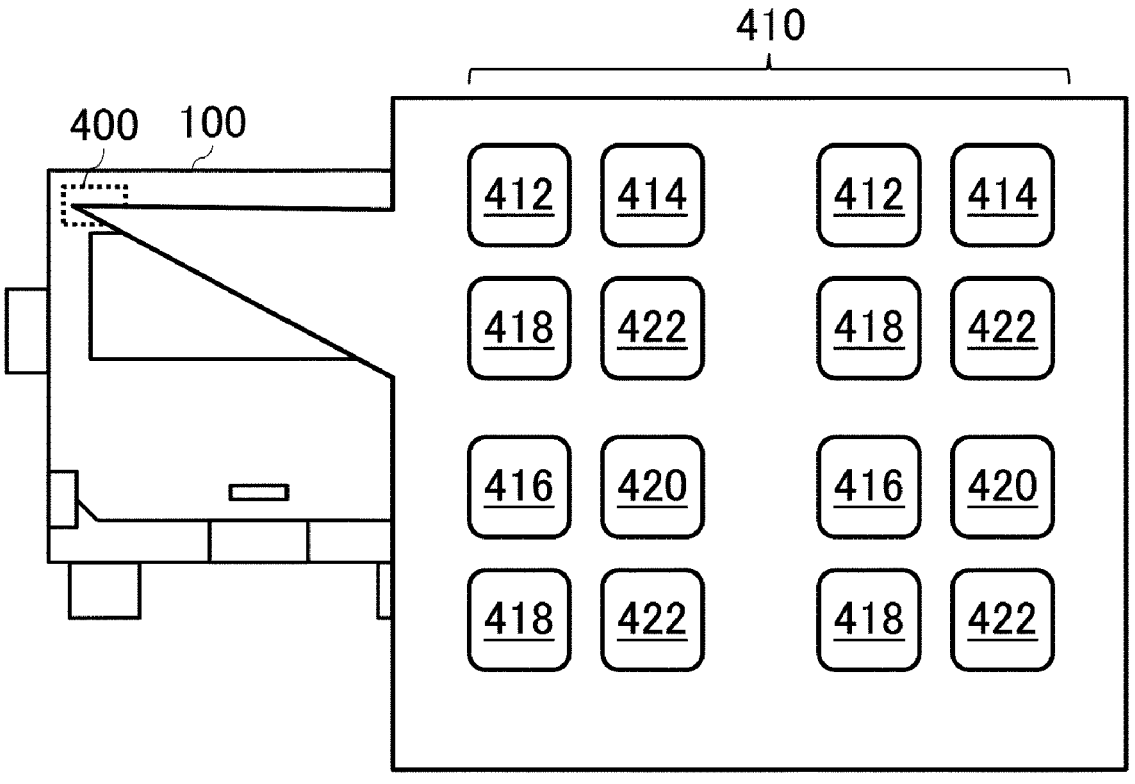
FIG. 12 schematically shows another example of a configuration of an antenna array 410.

FIG. 12 schematically shows another example of a configuration of an antenna array 410. FIG. 12 schematically shows an example of a configuration of the antenna array 410 for a case where an environment is assumed in which a vehicle 100 is sandwiched between two reflectors in a lateral direction and two reflectors in a longitudinal direction. The antenna array 410 may include a plurality of antennas 412, a plurality of antennas 414, a plurality of antennas 416, a plurality of antennas 418, a plurality of antennas 420, and a plurality of antennas 422.

The plurality of antennas 412 may include two antennas 412 which are arranged by being shifted in a lateral direction by a distance equivalent to an odd multiple of a half period of a maximum fluctuation period calculated from a minimum value for distances between an antenna 300 of a communication partner and the two reflectors in the lateral direction. The plurality of antennas 414 may include two antennas 414 which are respectively arranged by being shifted in a lateral direction with respect to the two antennas 412 by a distance equivalent to an odd multiple of a half period of a minimum fluctuation period calculated from respective distances between the antenna 300 of the communication partner and the two reflectors in the lateral direction and from the number of reflections.

The plurality of antennas 416 may include two antennas 416 which are respectively arranged by being shifted in a longitudinal direction with respect to the two antennas 412 by the distance equivalent to the odd multiple of the half period of the maximum fluctuation period calculated from a minimum value for a distance between the antenna 300 of the communication partner and a reflector. An antenna 416 may be an example of a third antenna. The plurality of antennas 418 may include four antennas 418 which are respectively arranged by being shifted in a longitudinal direction with respect to the two antennas 412 and the two antennas 416 by the distance equivalent to the odd multiple of the half period of the minimum fluctuation period calculated from respective distances between the antenna 300 of the communication partner and the two reflectors in the longitudinal direction and from the number of reflections. An antenna 418 may be an example of a fourth antenna.

The plurality of antennas 420 may include two antennas 420 which are respectively arranged by being shifted in a longitudinal direction with respect to the two antennas 414 by the distance equivalent to the odd multiple of the half period of the maximum fluctuation period calculated from the minimum value for the distance between the antenna 300 of the communication partner and the reflector. An antenna 420 may be an example of a fifth antenna. The plurality of antennas 422 may include four antennas 422 which are respectively arranged by being shifted in a longitudinal direction with respect to the two antennas 414 and the two antennas 420 by the distance equivalent to the odd multiple of the half period of the minimum fluctuation period calculated from the respective distances between the antenna 300 of the communication partner and the two reflectors in the longitudinal direction and from the number of reflections. An antenna 422 may be an example of a sixth antenna.

The antenna array 410 illustrated in FIG. 12 includes two antennas 412, two antennas 414, an antenna 416, and two antennas 418. In the example shown in FIG. 12, the two antennas 412 are arranged by being shifted in a lateral direction by a distance equivalent to an odd multiple of a half period of $L_{max}$ calculated from a minimum value for a distance between the antenna 300 of the communication partner and a reflector in a lateral direction. The two antennas 414 are respectively arranged by being shifted in a lateral direction with respect to the two antennas 412 by a distance equivalent to an odd multiple of a half period of $L_{min}$ calculated from the respective distances between the antenna 300 of the communication partner and the two reflectors in the lateral direction and from the number of reflections.

The antenna 416 is arranged by being shifted in a longitudinal direction with respect to one antenna 412 of the two antennas 412 by the distance equivalent to the odd multiple of the half period of $L_{max}$ calculated from a minimum value for a distance between the antenna 300 of the communication partner and a reflector in a longitudinal direction. The two antennas 418 are respectively arranged by being shifted in a longitudinal direction with respect to the one antenna 412 and the antenna 416 by the distance equivalent to the odd multiple of the half period of $L_{min}$ calculated from the respective distances between the antenna 300 of the communication partner and the two reflectors in the longitudinal direction and from the number of reflections.

Figure 13:
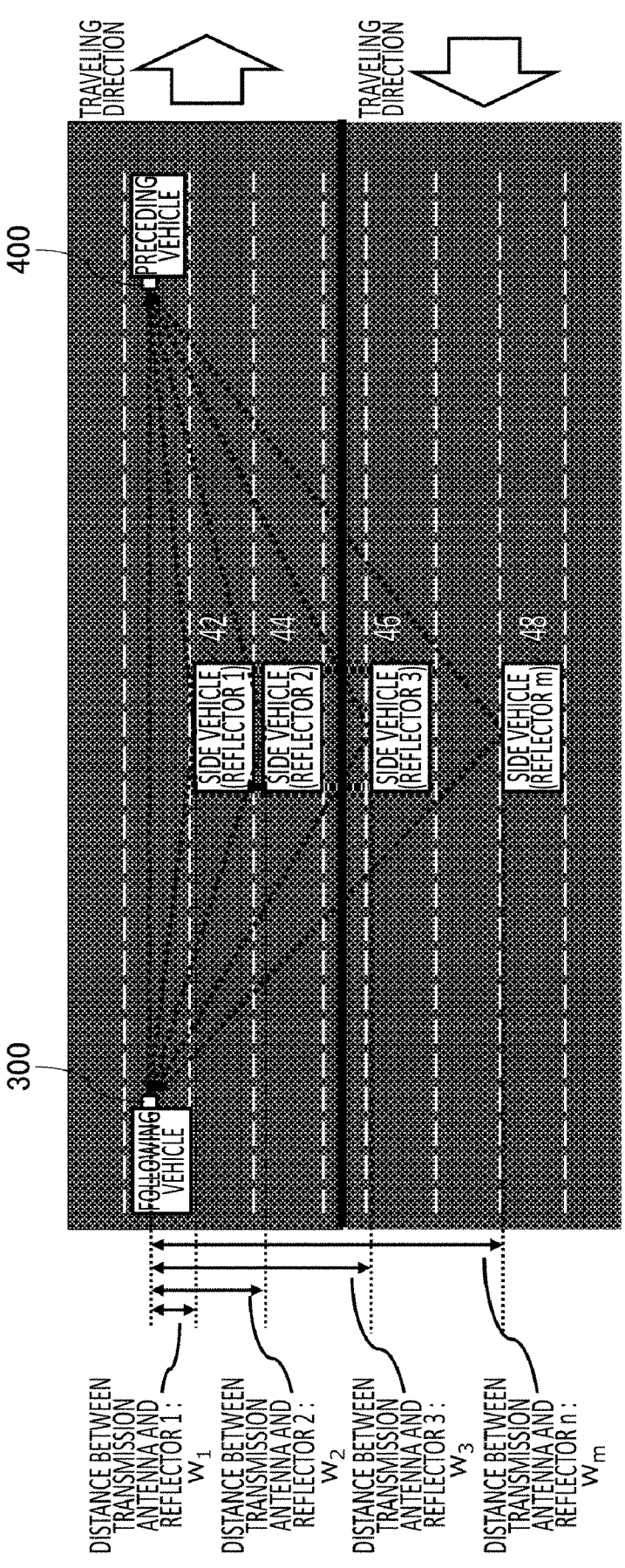
FIG. 13 schematically shows an example of an environment of an antenna unit 400 of an own vehicle and an antenna 300 of a communication partner.

FIG. 13 schematically shows an example of an environment of an antenna unit 400 of an own vehicle and an antenna 300 of a communication partner. Here, illustrated is an environment where a plurality of reflectors are located in the same direction with respect to the own vehicle and the communication partner, instead of an environment where the own vehicle and the communication partner are sandwiched between two reflectors.

A plurality of antennas 412 included in the antenna unit 400 may be arranged by being shifted in a lateral direction by a distance equivalent to an odd multiple of a half period of a maximum fluctuation period calculated from a minimum value for a distance between the antenna 300 of the communication partner and a reflector. A plurality of antennas 414 included in the antenna unit 400 may be respectively arranged by being shifted in a lateral direction with respect to the plurality of antennas 412 by a distance equivalent to an odd multiple of a half period of a minimum fluctuation period calculated from respective distances between the antenna 300 of the communication partner and the plurality of reflectors.

The example shown in FIG. 13 respectively illustrates a side vehicle 42, a side vehicle 44, a side vehicle 46, and a side vehicle 48, as an example of a first reflector, an example of a second reflector, an example of a third reflector, and an example of an mth reflector of m reflectors. FIG. 13 respectively shows a distance in a lateral direction between the antenna 300 and the side vehicle 42, a distance in a lateral direction between the antenna 300 and the side vehicle 44, a distance in a lateral direction between the antenna 300 and the side vehicle 46, and a distance in a lateral direction between the antenna 300 and the side vehicle 48, as $w_1$, $w_2$, $w_3$, and $w_m$.

When reflected waves arrive from the plurality of reflectors with different distances to the antenna 300 which is a transmission antenna, a level of a combined wave of a direct wave and each reflected wave periodically fluctuates in a lateral direction in the antenna unit 400, but each of fluctuation periods is $L_m = (\lambda d)/(2 \times [$a distance to a reflector m$]$. A minimum fluctuation period to be considered among these fluctuation periods is defined as $L_{min}$. For example, $L_3 = (\lambda d)/(2w_3)$ with the side vehicle 46 may be defined as $L_{min}$.

Although FIG. 13 illustrates the side vehicles as examples of the plurality of reflectors located in the same direction, the reflectors are not limited thereto, and a side wall on only one side, a wall surface of a building, and the like may also serve as the reflectors. In addition, although FIG. 13 illustrates an environment where the plurality of reflectors are located in the same direction with respect to the own vehicle and the communication partner, the present invention is not limited thereto, the plurality of reflectors may be located in different directions with respect to the own vehicle and the communication partner.

Figure 14:
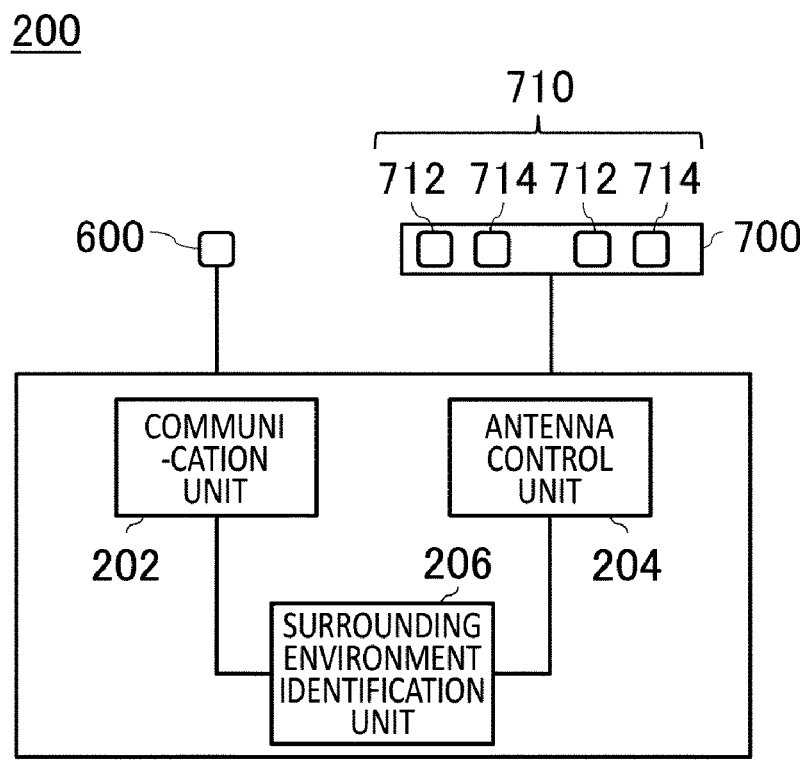
FIG. 14 schematically shows another example of a communication apparatus 200.

FIG. 14 schematically shows another example of a communication apparatus 200. The communication apparatus 200 shown in FIG. 14 performs communication using an antenna 600 and an antenna unit 700. The antenna 600 may be arranged on a front of a vehicle 100 similarly to an antenna 300, for example. The antenna unit 700 may be arranged on a back of the vehicle 100 similarly to an antenna unit 400, for example. An antenna array 710 may include a plurality of antennas 712 and a plurality of antennas 714.

The communication apparatus 200 includes a communication unit 202, an antenna control unit 204, and a surrounding environment identification unit 206. The communication unit 202 performs communication using the antenna 600 and the antenna unit 700. In addition, the communication unit 202 may communicate with a control apparatus of the vehicle 100 mounted with the communication apparatus 200. The control apparatus of the vehicle 100 may include a car navigation system.

The antenna control unit 204 controls the antenna array 710. The plurality of antennas 712 and the plurality of antennas 714 may be configured such that their positions can be changed. The plurality of antennas 712 and the plurality of antennas 714 may be configured such that their positions can be changed in a lateral direction. The plurality of antennas 712 and the plurality of antennas 714 may be configured such that their positions can be changed in a longitudinal direction. The plurality of antennas 712 and the plurality of antennas 714 may be configured such that their positions can be changed in a lateral direction and a longitudinal direction.

The surrounding environment identification unit 206 identifies a surrounding environment of the vehicle 100 mounted with the communication apparatus 200 and a vehicle mounted with a communication partner of the communication apparatus 200. The surrounding environment identification unit 206 identifies the surrounding environment, for example, by obtaining, from the control apparatus of the vehicle 100, map information of a position at which the vehicle 100 is travelling. The surrounding environment identification unit 206 may identify presence of a surrounding reflector. Examples of the reflector include a side wall, architectural structures such as a building and a house, a tunnel, and the like.

The antenna control unit 204 may control positions of the plurality of antennas 712 and the plurality of antennas 714 on a basis of a result of identification by the surrounding environment identification unit 206. For example, on a basis of information on the reflector which has been identified, the antenna control unit 204 controls the positions of the plurality of antennas 712 and the plurality of antennas 714 such that the plurality of antennas 412 are shifted by a distance equivalent to an odd multiple of a half period of a maximum fluctuation period of a radio wave having a longest fluctuation period among a plurality of radio waves received from the antenna 300 of the communication partner and that the plurality of antennas 414 are respectively shifted with respect to the plurality of antennas 412 by a distance equivalent to an odd multiple of a half period of a minimum fluctuation period of a radio wave having a shortest fluctuation period among the plurality of radio waves received from the antenna 300 of the communication partner. As a result, it is possible to arrange the plurality of antennas 712 and the plurality of antennas 714 so as to enhance a diversity effect in accordance with the surrounding environment of the vehicle 100 and the communication partner of the time and to contribute to improvement of a reception quality.

Although the above embodiment has been described using, as an example, a case where there is a single transmission antenna and a plurality of reception antennas, the present invention is not limited thereto, and transmission and reception may be interchanged. That is, the vehicle 100 may include: an antenna unit for transmission having an antenna array including a plurality of antennas; and one antenna for reception.

Figure 15:
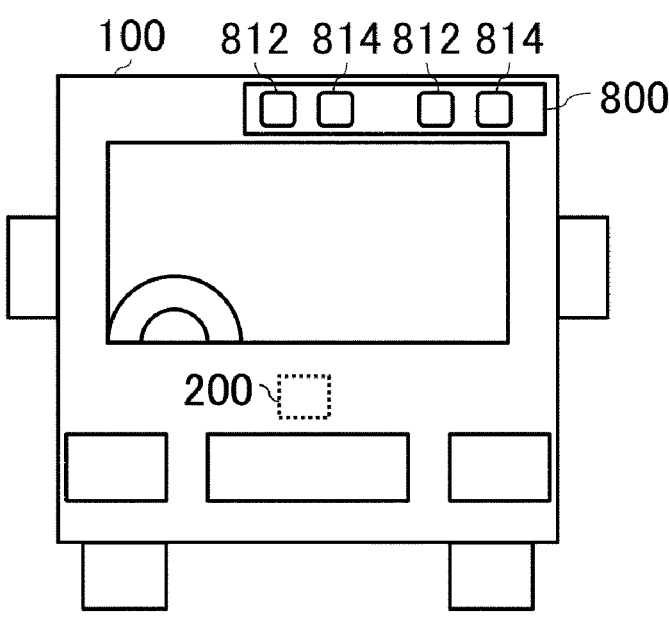
FIG. 15 schematically shows another example of a system 10.
Figure 16:
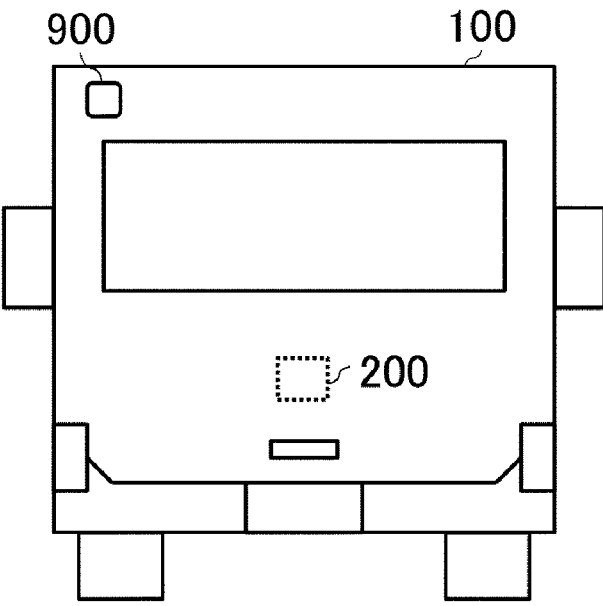
FIG. 16 schematically shows another example of a system 10.

FIG. 15 and FIG. 16 schematically show another example of a system 10. The system 10 includes a communication apparatus 200, an antenna unit 800, and a movable object mounted with the communication apparatus 200 and the antenna unit 800. A vehicle 100 in FIG. 15 and FIG. 16 is an example of the movable object.

FIG. 15 schematically shows a front of the vehicle 100, and FIG. 16 schematically shows a back of the vehicle 100. The antenna unit 800 is arranged on the front of the vehicle 100. An antenna 900 is arranged on the back of the vehicle 100.

The antenna unit 800 includes an antenna array 810. FIG. 15 illustrates a case where the antenna unit 800 has the antenna array 810 composed of a plurality of antennas 812 and a plurality of antennas 814. The antenna unit 800 may be an example of an antenna apparatus. The communication apparatus 200 including the antenna unit 800 may be an example of the antenna apparatus.

The communication apparatus 200 uses the antenna 900 and the antenna unit 800 to communicate with a communication apparatus 200 mounted on another vehicle 100 which is different from the vehicle 100 (which may be described as an own vehicle) mounted with the communication apparatus 200. For example, the communication apparatus 200 uses the antenna unit 800 to transmit data to another vehicle 100 travelling ahead of the own vehicle, and uses the antenna 900 to receive data from another vehicle 100 travelling behind the own vehicle. The antenna unit 800 may be a transmission antenna unit, and the antenna 900 may be a reception antenna.

The plurality of antennas 812 may be arranged by being shifted by a distance equivalent to an odd multiple of a half period of a maximum fluctuation period of a radio wave having a longest fluctuation period among a plurality of radio waves transmitted by the antenna unit 800 and received by a communication partner. The plurality of antennas 814 may be respectively arranged by being shifted with respect to the plurality of antennas 812 by a distance equivalent to an odd multiple of a half period of a minimum fluctuation period of a radio wave having a shortest fluctuation period among the plurality of radio waves. This can prevent reception levels from simultaneously becoming null.

Although it is shown that spatial diversity is effective in vehicle-to-vehicle communication (Non-Patent Document 1), there is no mention of an optimal antenna array configuration method. It is described that antenna spacing for spatial diversity in mobile communication is based on non-line-of-sight communication in general and that it suffices to have a spacing of a half wavelength or more on a mobile station side and a spacing of 10 wavelengths or more on a base station side (Non-Patent Document 2). The vehicle-to-vehicle communication is line-of-sight communication, but in a case of the line-of-sight communication, a level may periodically fluctuate in a direction perpendicular to a reflection surface (in an upward direction in a case of a road surface) within a flat surface perpendicular to the road surface where a reception point is located, due to interference of reflected waves from reflectors such as the road surface and a side reflector (a side wall, a side vehicle, or the like). When a reflector is the road surface or the side reflector, a distance between transmission antenna and reflector is constant and a level fluctuation period is also constant regardless of a position at which the reception antenna is installed on a back of a preceding vehicle, so ensuring an optimal reception antenna spacing (an odd multiple of a half period of a fluctuation period) can avoid a null point where the level decreases and improve a communication quality.

However, when the reflector is, for example, a tunnel, assuming that a distance between a transmission antenna position and a regular reflection position on a tunnel inner wall is the distance between transmission antenna and reflector, a cut surface is circular, so the distance between transmission antenna and reflector varies and the level fluctuation period also varies depending on the position at which the reception antenna is installed. Therefore, there has been a case where the optimal reception antenna spacing cannot be determined, all antenna positions used for diversity become the null point, and the communication quality deteriorates. The system 10 according to the present embodiment has an antenna array configuration in which an environment, for example, in the tunnel is also considered.

Hereinafter, the present invention will be described through embodiments of the invention, but the following embodiments do not limit the invention according to claims. In addition, not all of the combinations of features described in the embodiments are essential to the solution of the invention.

Figure 17:
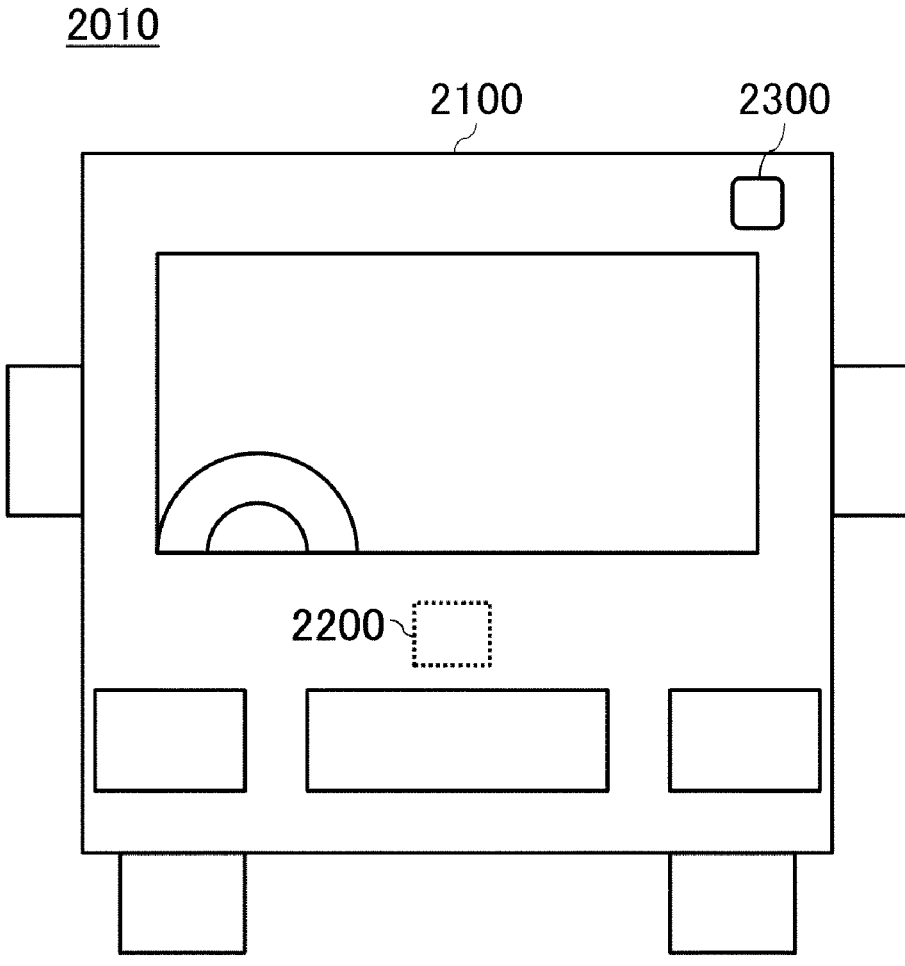
FIG. 17 schematically shows an example of a system 2010.
Figure 18:
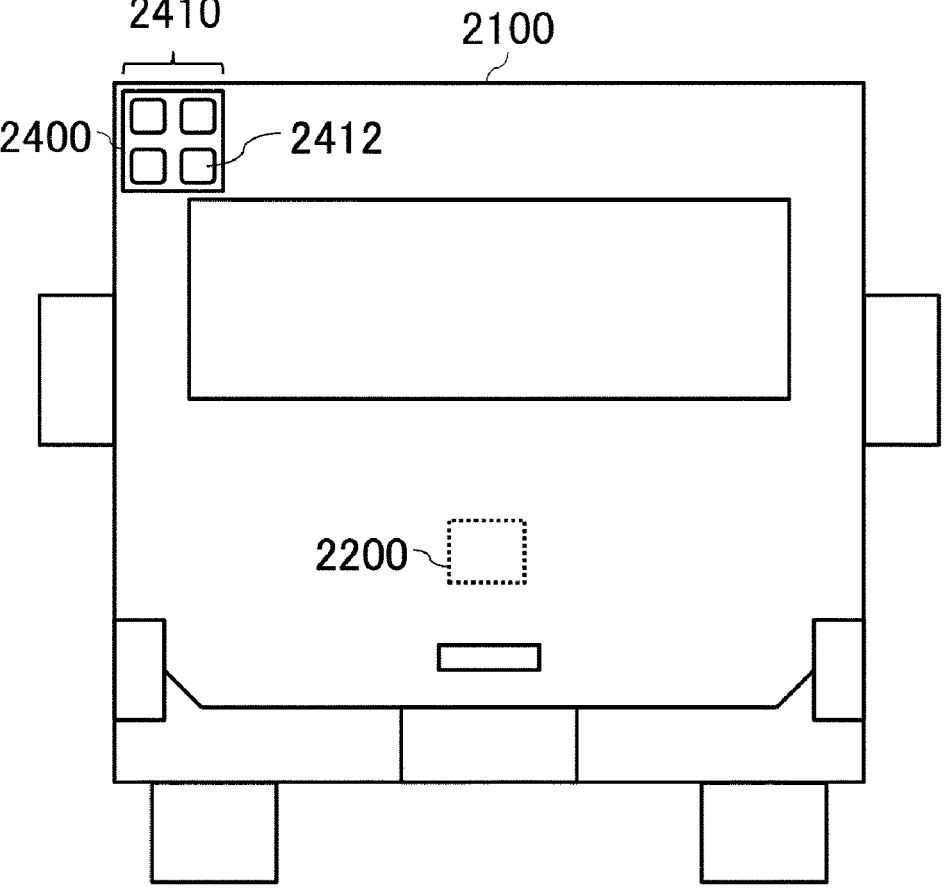
FIG. 18 schematically shows an example of a system 2010.

FIG. 17 and FIG. 18 schematically show an example of a system 2010 according to the present embodiment. The system 2010 includes a communication apparatus 2200, an antenna unit 2400, and a movable object mounted with the communication apparatus 2200 and the antenna unit 2400. A vehicle 2100 in FIG. 17 and FIG. 18 is an example of the movable object. The vehicle 2100 may be an automobile.

FIG. 17 schematically shows a front of the vehicle 2100, and FIG. 18 schematically shows a back of the vehicle 2100. An antenna 2300 is arranged on the front of the vehicle 2100. The antenna unit 2400 is arranged on the back of the vehicle 2100.

The antenna unit 2400 includes an antenna array. FIG. 18 illustrates a case where the antenna unit 2400 has an antenna array 2410 composed of a plurality of antennas 2412. The antenna unit 2400 may be an example of an antenna apparatus. The communication apparatus 2200 including the antenna unit 2400 may be an example of the antenna apparatus.

The communication apparatus 2200 uses the antenna 2300 and the antenna unit 2400 to communicate with a communication apparatus 2200 mounted on another vehicle 2100 which is different from the vehicle 2100 (which may be described as an own vehicle) mounted with the communication apparatus 2200. For example, the communication apparatus 2200 uses the antenna 2300 to transmit data to another vehicle 2100 travelling ahead of the own vehicle, and uses the antenna unit 2400 to receive data from another vehicle 2100 travelling behind the own vehicle. An antenna 2412 may be an example of a reception antenna. The antenna 2300 may be an example of a transmission antenna.

Figure 19:
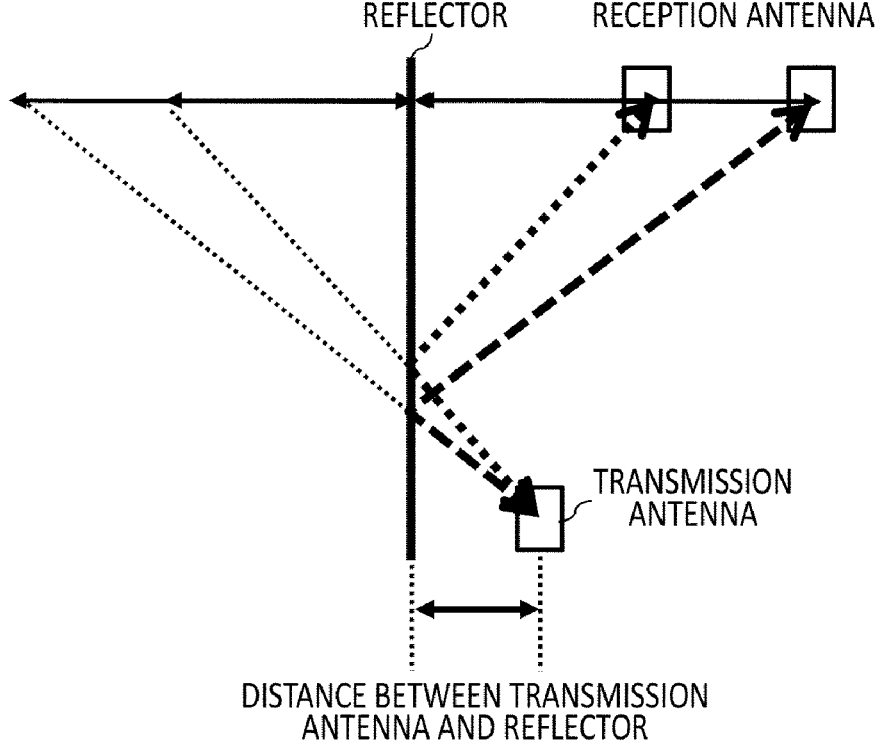

FIG. 19 is an explanatory drawing for illustrating a distance between transmission antenna and reflector for a case where a reflector is a road surface, a side reflector, or the like. When the reflector is the road surface, a lateral direction in FIG. 19 is an actual height direction, but in a situation where a distance between the transmission antenna and the road surface is constant, even if a distance between a reception antenna and the road surface varies, the distance between transmission antenna and reflector is constant. When the reflector is the side reflector (for example, a side wall of a highway), the lateral direction in FIG. 19 is an actual lateral direction, but in a situation where a distance between the transmission antenna and the side reflector is constant, even if a distance between the reception antenna and the side reflector varies, the distance between transmission antenna and reflector is constant. Therefore, a fluctuation period of a wave reflected by the reflector which is transmitted by the transmission antenna and received by the reception antenna is also constant.

Figure 20:
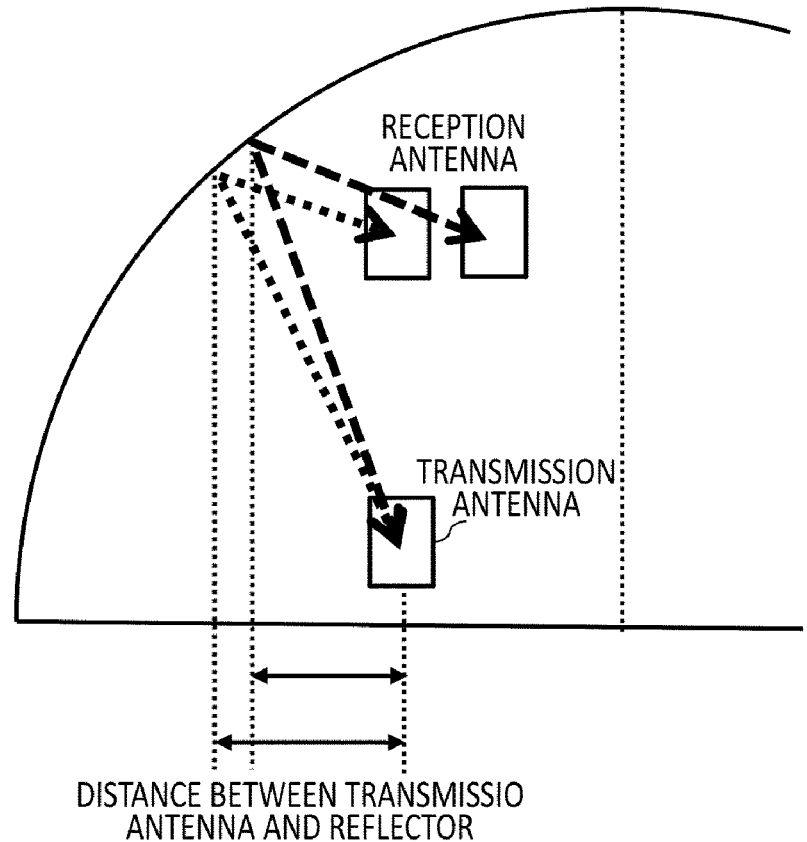
FIG. 20 is an explanatory drawing for illustrating a distance between transmission antenna and reflector for a case where a reflector is a tunnel.

FIG. 20 is an explanatory drawing for illustrating a distance between transmission antenna and reflector for a case where a reflector is a tunnel. FIG. 20 schematically shows a positional relationship between a transmission antenna of a vehicle behind and a reception antenna of a vehicle ahead. Here, it is assumed that a distance between a transmission antenna position and a regular reflection position on a tunnel inner wall is the distance between transmission antenna and reflector.

As illustrated in FIG. 20, in a situation where a distance between the transmission antenna and the tunnel inner wall is constant, when a distance between the reception antenna and the tunnel inner wall varies, the distance between transmission antenna and reflector also varies. Therefore, a fluctuation period of a wave reflected by the reflector which is transmitted by the transmission antenna and received by the reception antenna also varies.

Figure 21:
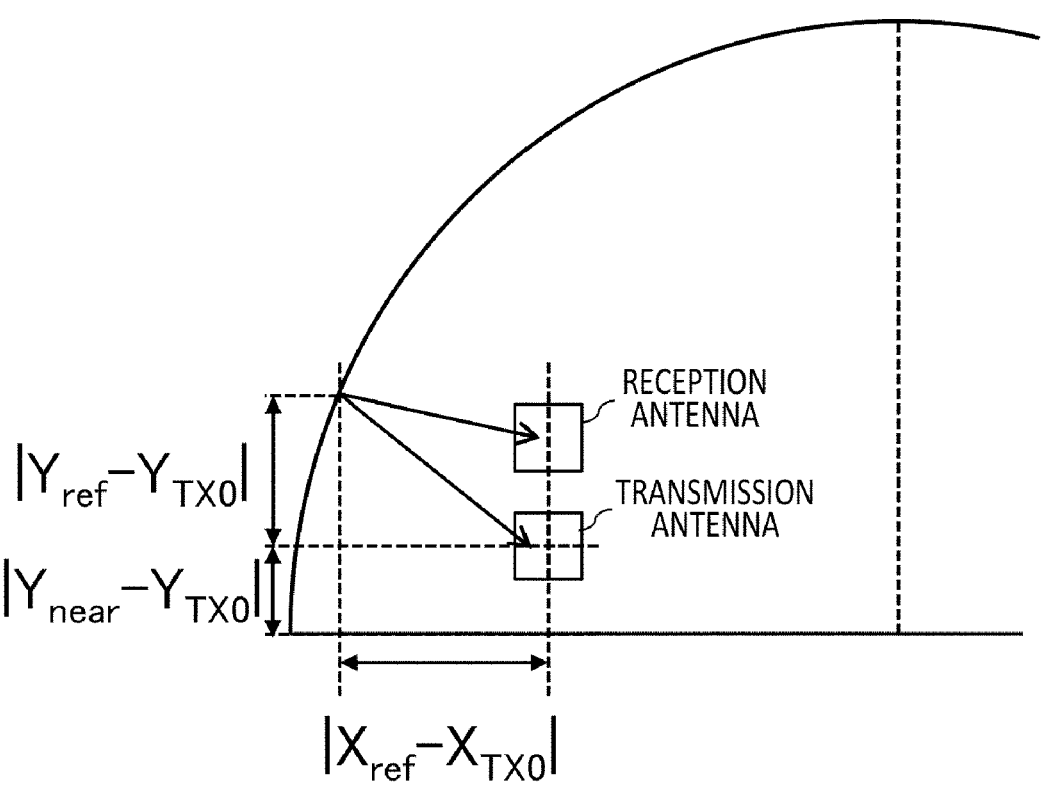
FIG. 21 is an explanatory drawing for illustrating arrangement of a plurality of antennas 2412 in an antenna unit 2400.

FIG. 21 and FIG. 22 are explanatory drawings for illustrating arrangement of a plurality of antennas 2412 in an antenna unit 2400. In the present example, a plurality of regular reflection positions on a tunnel inner wall between a transmission antenna and a reception antenna are described as $(X_{refi}, Y_{refi})$ (i=1, 2, . . . ). In the present example, a transmission antenna position is described as $(X_{TX0}, Y_{TX0})$.

The plurality of antennas 2412 according to the present embodiment are arranged by being shifted by a distance equivalent to an odd multiple of a half period of a fluctuation period of each horizontal and vertical component, assuming that a difference for each component between the plurality of regular reflection positions on a reflector between a transmission antenna of a communication partner and any antenna 2412 (which may be described as a first reception antenna 2412) of the plurality of antennas 2412, and a position of the transmission antenna, is a distance for each component between the transmission antenna and the reflector, and using a value in a region where a fluctuation period is stable. The present example describes, as $(\lambda d/2|X_{ref0}-X_{TX0}|, \lambda d/2|Y_{ref0}-Y_{TX0}|)$, the value in the region where the fluctuation period calculated with an inter-vehicle distance and a wavelength of a working frequency $(\lambda d/2|X_{refi}-X_{TX0}|, \lambda d/2|Y_{refi}-Y_{TX0}|)$ is stable.

Specifically, the plurality of antennas 2412 may be arranged by being shifted by a distance equivalent to an odd multiple of a half period of a fluctuation period of each horizontal and vertical component $((2j+1)\lambda d/2|X_{ref0}-X_{TX0}|, (2k+1)\lambda d/2|Y_{ref0}-Y_{TX0}|)$ (j, k=0, 1, 2 . . . ), assuming that the difference for each component between the plurality of regular reflection positions on the reflector between the transmission antenna of the communication partner and the first reception antenna $(X_{refi}, Y_{refi})$, and the position of the transmission antenna $(X_{TX0}, Y_{TX0})$, is the distance for each component between the transmission antenna and the reflector $(|X_{refi}-X_{TX0}|, |Y_{refi}-Y_{TX0}|)$, and using the value in the region where the fluctuation period calculated using a distance between the vehicle 2100 and the communication partner as well as a working frequency $(\lambda d/2|X_{refi}-X_{TX0}|, \lambda d/2|Y_{refi}-Y_{TX0}|)$ is stable $(\lambda d/2|X_{ref0}-X_{TX0}|, \lambda d/2|Y_{ref0}-Y_{TX0}|)$.

For example, the plurality of antennas 2412 are arranged by being shifted by a distance calculated assuming that the reflector is an inner wall of a tunnel in which the vehicle 2100 is expected to travel. This can improve a communication quality for a case where the vehicle 2100 travels in the tunnel.

The regular reflection positions described above may be calculated on a basis of dimensions of any tunnel of a plurality of existing tunnels. The regular reflection positions may be calculated on a basis of an average value for dimensions of a plurality of existing tunnels. The regular reflection positions may be calculated on a basis of dimensions theoretically set as dimensions of the tunnel.

It should be noted that the plurality of antennas 2412 may be arranged by being shifted assuming that there is a reflector closer than the tunnel in either a horizontal direction or a vertical direction. Examples of such a reflector in a horizontal direction include a side vehicle travelling on a side of the vehicle 2100, a side wall, and the like. Examples of such a reflector in a vertical direction include a road surface and the like. The present example respectively describes a horizontal component and a vertical component of such a close reflector, as $X_{near}$ and $Y_{near}$.

For example, the plurality of antennas 2412 may be arranged by being shifted by a distance calculated assuming that the reflector in the horizontal direction is the tunnel inner wall and that the reflector in the vertical direction is the road surface. For example, the plurality of antennas 2412 may be arranged by being shifted by the distance equivalent to the odd multiple of the half period of the fluctuation period of each horizontal and vertical component, assuming that a difference for each horizontal component between the plurality of regular reflection positions on the tunnel inner wall between the transmission antenna of the communication partner and the first reception antenna, and the position of the transmission antenna, is a distance for each horizontal component between the transmission antenna and the tunnel inner wall in a horizontal direction, assuming that a difference for each vertical component between the transmission antenna and the road surface is a distance for each vertical component between the transmission antenna and the road surface in a vertical direction, and using the value in the region where the fluctuation period is stable. In this case, it may be assumed that a distance between transmission antenna and reflector is a distance between transmission antenna and close reflector $|X_{near}-X_{TX0}|$ and that the fluctuation period for each component is $\lambda d/2|X_{near}-X_{TX0}|$, with respect to a case where it is assumed that reflectors in a horizontal direction and a vertical direction are tunnel inner walls. This can contribute to improvement of the communication quality when the antenna unit 2400 is installed at a position where a closest reflector in a vertical direction is not the tunnel inner wall but the road surface.

For example, the plurality of antennas 2412 may be arranged by being shifted by a distance calculated assuming that the reflector in the horizontal direction is another vehicle located on the side of the vehicle 2100 and that the reflector in the vertical direction is the tunnel inner wall. For example, the plurality of antennas 2412 may be arranged by being shifted by the distance equivalent to the odd multiple of the half period of the fluctuation period of each horizontal and vertical component, assuming that a difference for each horizontal component between the transmission antenna of the communication partner and another vehicle is a distance for each horizontal component between the transmission antenna and another vehicle in a horizontal direction, assuming that a difference for each vertical component between the plurality of regular reflection positions on the tunnel inner wall between the transmission antenna and the first reception antenna, and the position of the transmission antenna, is a distance for each vertical component between the transmission antenna and the tunnel inner wall, and using the value in the region where the fluctuation period is stable. In this case, it may be assumed that the distance between transmission antenna and reflector is the distance between transmission antenna and close reflector $|Y_{near}-Y_{TX0}|$ and that the fluctuation period for each component is $\lambda d/2|Y_{near}-Y_{TX0}|$, with respect to the case where it is assumed that the reflectors in the horizontal direction and the vertical direction are the tunnel inner walls.

Figure 23:
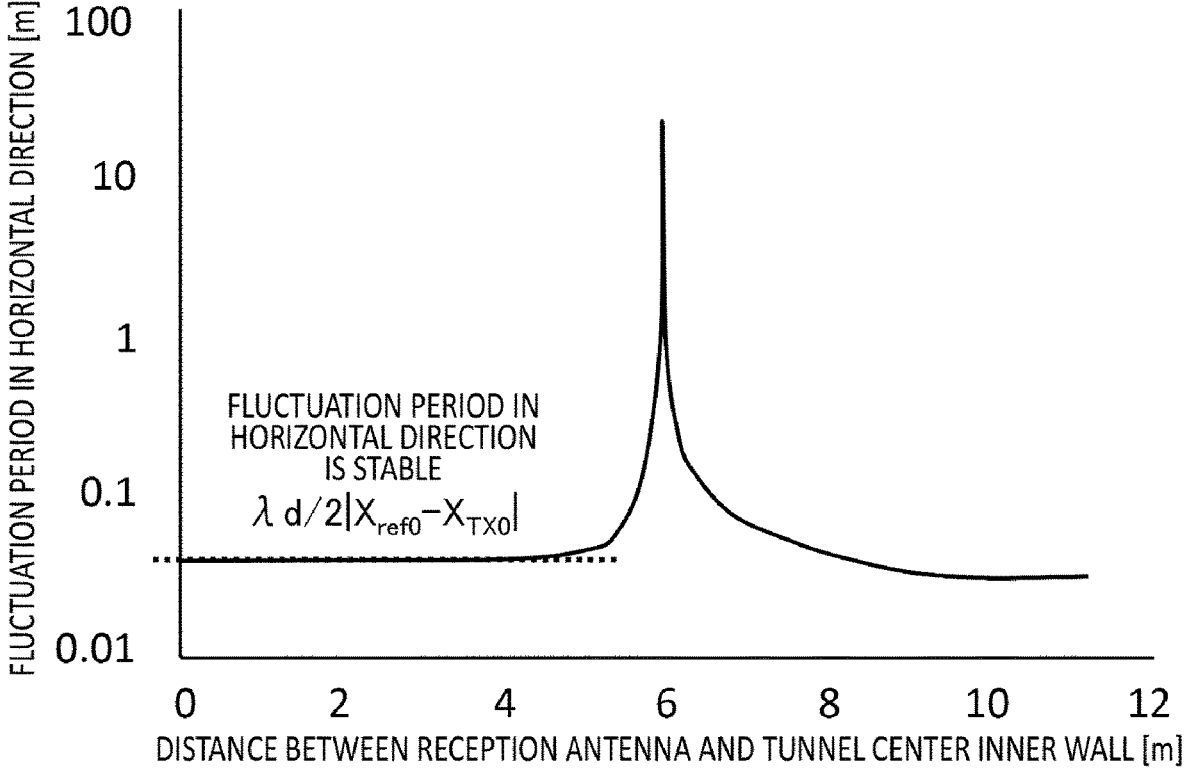
FIG. 23 is an explanatory drawing for illustrating a relationship between a distance between reception antenna and tunnel center inner wall, and a fluctuation period of a radio wave in a horizontal direction.

FIG. 23 is an explanatory drawing for illustrating a relationship between a distance between reception antenna and tunnel center inner wall, and a fluctuation period of a radio wave in a horizontal direction. A graph shown in FIG. 23 shows a variation in a fluctuation period of a reflected wave received by the reception antenna for a case where a transmission antenna position is fixed and a distance of the reception antenna from a road end in a horizontal direction is varied in a tunnel with a radius of 5.6 m.

Figure 24:
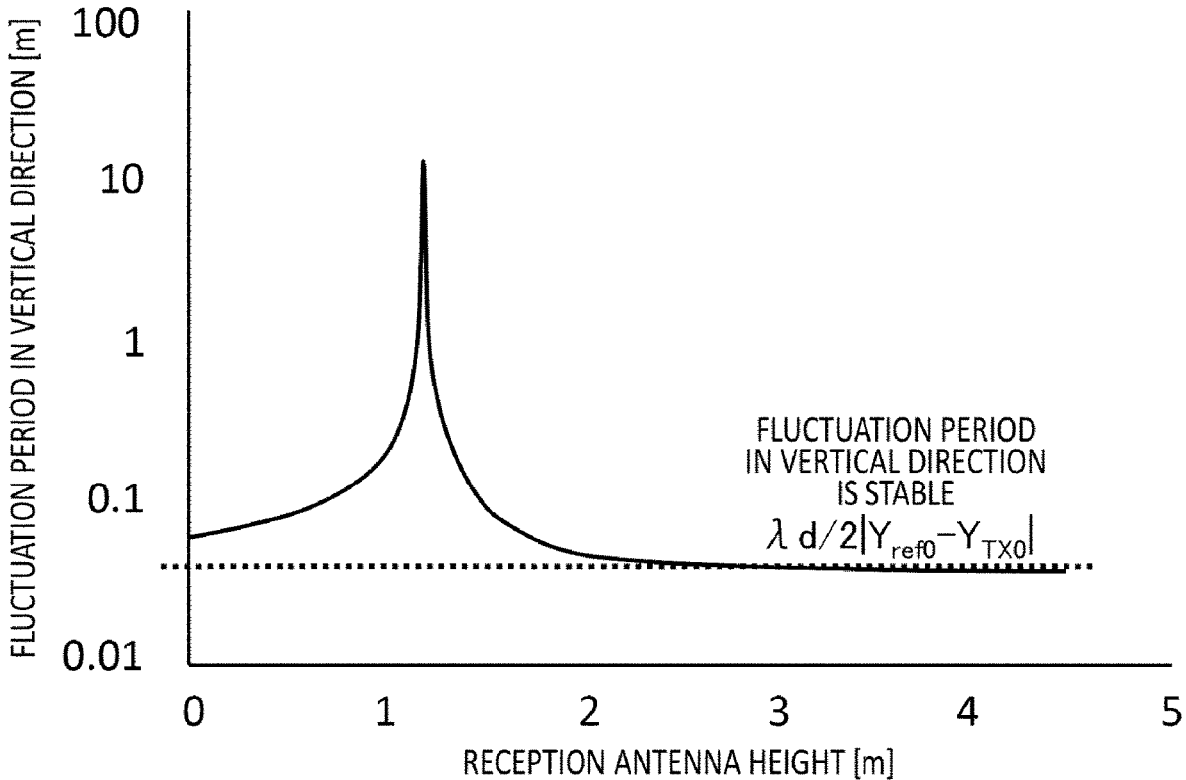
FIG. 24 is an explanatory drawing for illustrating a relationship between a reception antenna height and a fluctuation period of a radio wave in a vertical direction.
Figure 25:
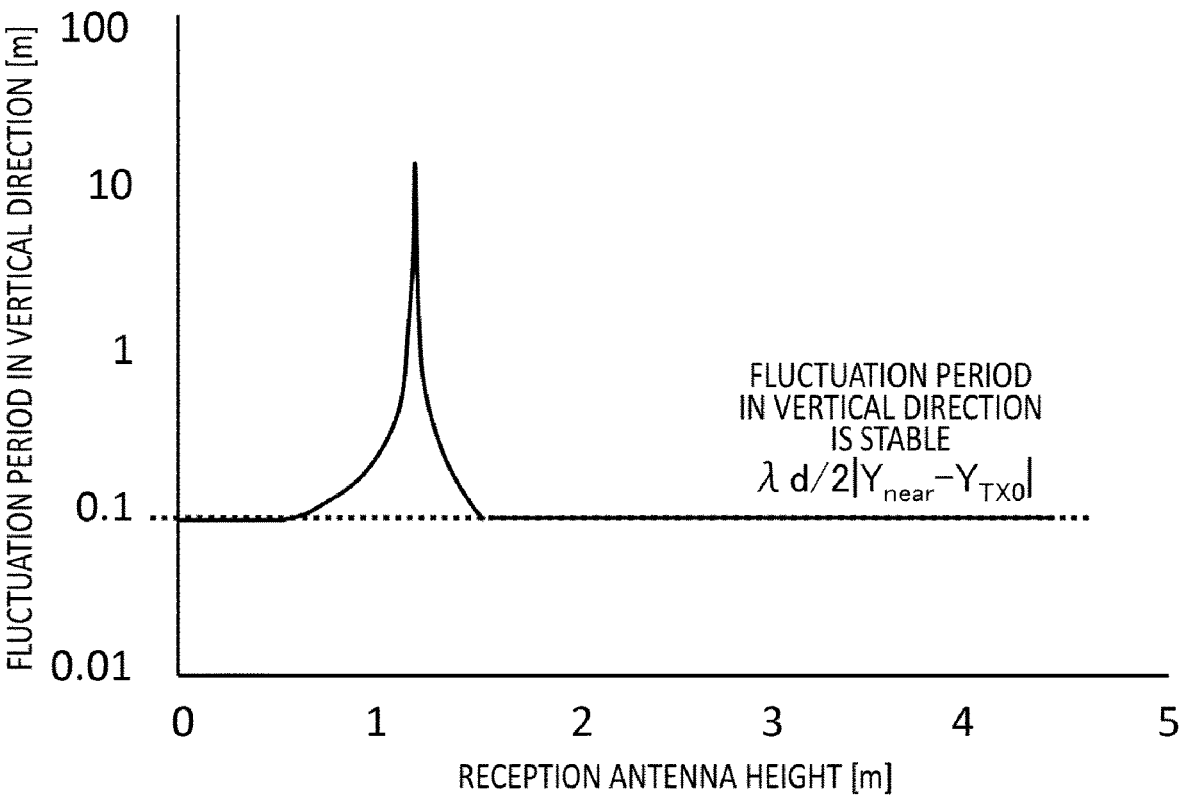
FIG. 25 is an explanatory drawing for illustrating a relationship between a reception antenna height and a fluctuation period of a radio wave in a vertical direction.

FIG. 24 and FIG. 25 are explanatory drawings for illustrating a relationship between a reception antenna height and a fluctuation period of a radio wave in a vertical direction. FIG. 24 shows a case where a close reflector (a road surface) is not considered, and FIG. 25 shows a case where the close reflector (the road surface) is considered. A graph shows a variation in a fluctuation period of a reflected wave received by a reception antenna for a case where a transmission antenna position is fixed and a height of the reception antenna is varied in a tunnel with a radius of 5.6 m.

A value in a region where the fluctuation period is stable may be a mode value of each component. That is, a plurality of antennas 2412 may be arranged by being shifted by a distance equivalent to an odd multiple of a half period of a fluctuation period of each horizontal and vertical component, assuming that a difference for each component between a plurality of regular reflection positions on a reflector between a transmission antenna of a communication partner and a first reception antenna, and a position of the transmission antenna, is a distance for each component between the transmission antenna and the reflector, and using the mode value of each component.

In addition, the value in the region where the fluctuation period is stable may be a median value of each component. That is, the plurality of antennas 2412 may be arranged by being shifted by the distance equivalent to the odd multiple of the half period of the fluctuation period of each horizontal and vertical component, assuming that the difference for each component between the plurality of regular reflection positions on the reflector between the transmission antenna of the communication partner and the first reception antenna, and the position of the transmission antenna, is the distance for each component between the transmission antenna and the reflector, and using the median value of each component.

Especially when a frequency of the mode value of each component is smaller than a predetermined percentage, it may be desirable to use the median value of each component. Examples of the predetermined percentage include approximately 15%, but the percentage may be experimentally determined in accordance with each condition.

Figure 26:
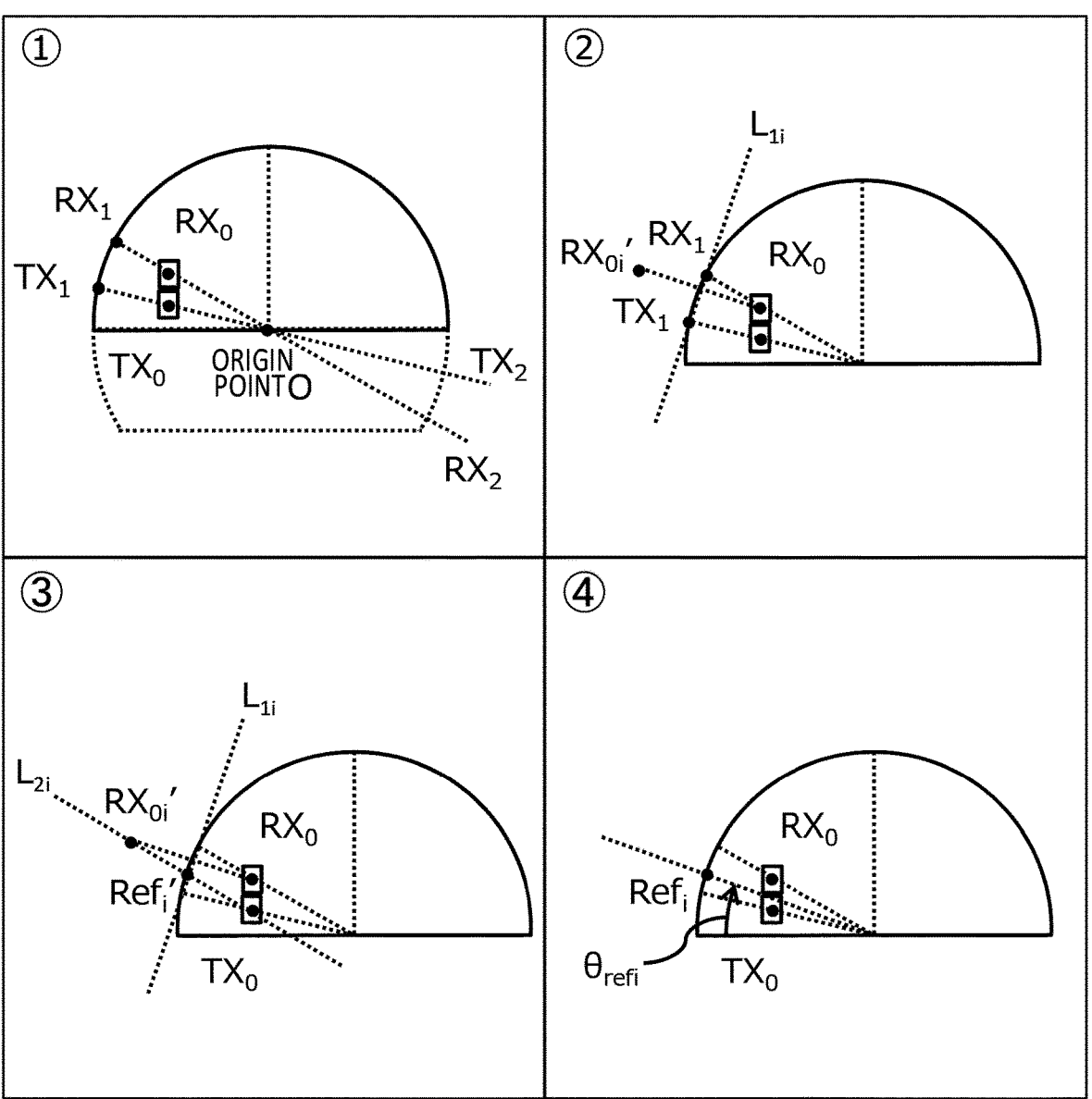
FIG. 26 is an explanatory drawing for illustrating a method for determining a regular reflection point and a mode value.

FIG. 26 is an explanatory drawing for illustrating a method for determining a regular reflection point and a mode value. Here, a plurality of regular reflection positions on a tunnel inner wall between a transmission antenna and a reception antenna are described as Refi ($X_{refi}$, $Y_{refi}$).

First, with a tunnel center as an origin point O, calculation is made for intersecting points $TX_1$ ($X_{TX1}$, $Y_{TX1}$) and $RX_1$ ($X_{RX1}$, $Y_{RX1}$) of straight lines connecting the origin point O to a point of a transmission antenna center $TX_0$ ($X_{TX0}$, $Y_{TX0}$) and to a point of a reception antenna center $RX_0$ ($X_{RX0}$, $Y_{RX0}$), and an arc, and for points $TX_2$ ($X_{TX2}$, $Y_{TX2}$) and $RX_2$ ($X_{RX2}$, $Y_{RX2}$) which are symmetrical to the intersecting points with respect to the origin point.

Next, calculation is made for a point $RX_{0i}'$ ($X_{RX0}+X_i'$, $Y_{RX0}+Y_i'$) which is line-symmetrical to the reception antenna center with respect to each of straight lines $L_{1i}$ ($Y=a_{1i}X+b_{1i}$) connecting $TX_1$ to $RX_1$ and $TX_2$ to $RX_2$. Here, when $a_{1i}X_{RX0}+b_{1i} \geq Y_{RX0}$ and $(Y_{RX0}-b_{1i})/a_{1i} \geq X_{RX0}$, when $X_i'=+m_i a_{1i}$, $Y_i'=+m_i$, $a_{1i}X_{RX0}+b_{1i} \geq Y_{RX0}$, and $(Y_{RX0}-b_{1i})/a_{1i} < X_{RX0}$, when $X_i'=-m_i a_{1i}$, $Y_i'=+m_i$, $a_{1i}X_{RX0}+b_{1i} < Y_{RX0}$, and $(Y_{RX0}-b_{1i})/a_{1i} \geq X_{RX0}$, when $X_i'=+m_i a_{1i}$, $Y_i'=-m_i$, $a_{1i}X_{RX0}+b_{1i} < Y_{RX0}$, and $(Y_{RX0}-b_{1i})/a_{1i} < X_{RX0}$, $X_i'=-m_i a_{1i}$, $Y_i'=-m_i$, and $m_i$ is a distance between the straight line $L_{1i}$ and the reception antenna center $RX_0$.

Next, calculation is made for an intersecting point $Ref_i'$ ($X_{refi}'$, $Y_{refi}'$) of a straight line $L_{2i}$ ($Y=a_{2i}X+b_{2i}$) passing through the transmission antenna center $TX_0$ and the point $RX_{0i}'$, and the straight line $L_{1i}$. Next, an angle $\theta_{refi}$ of a reflection point is calculated from a value of the intersecting point $Ref_i'$, and a regular reflection position $Ref_i$ ($X_{refi}$, $Y_{refi}$), which is an intersecting point of a straight line connecting the intersecting point $Ref_i'$ to the origin point O and the tunnel inner wall, is calculated.

Assuming that the reception antenna center is within a range where installation of the reception antenna is considered in the tunnel for each horizontal and vertical component, the above calculation is repeated, and the mode value is extracted from every distance between transmission antenna and reflector which has been calculated. It should be noted that a median value may be extracted instead of the mode value. Especially when a frequency of the mode value of each component is smaller than a predetermined percentage, it may be desirable to use the median value of each component. Examples of the predetermined percentage include approximately 15%, but the percentage may be experimentally determined in accordance with each condition.

Figure 27:
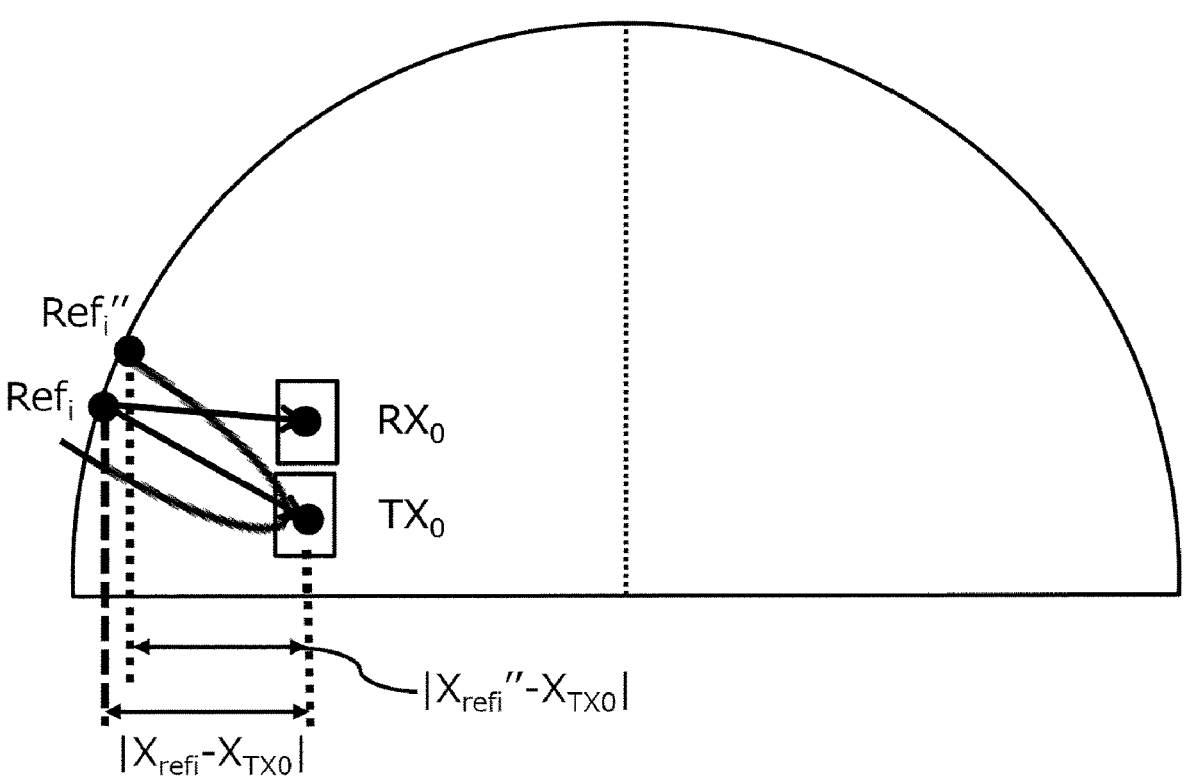
FIG. 27 is an explanatory drawing for illustrating a distance between transmission antenna and reflector for a case where a Fresnel zone is considered.

FIG. 27 is an explanatory drawing for illustrating a distance between transmission antenna and reflector for a case where a Fresnel zone is considered. In line-of-sight communication, it is desirable that 60% or more of a first Fresnel zone should be secured.

When the reflector has a flat surface like a road surface, a side wall, or the like, the distance between transmission antenna and reflector at a regular reflection position $Ref_i$ ($X_{refi}$, $Y_{refi}$) and the distance between transmission antenna and reflector at a first Fresnel zone end position $Ref_i''$ ($X_{refi}''$, $Y_{refi}''$) located above or below the regular reflection position $Ref_i$ are the same ($X_{refi}=X_{refi}''$, $Y_{refi}=Y_{refi}''$), but when the reflector has a curved surface like a tunnel, the distance between transmission antenna and reflector may be shorter at the first Fresnel zone end position than at the regular reflection position ($X_{refi}>X_{refi}''$, $Y_{refi}>Y_{refi}''$).

Therefore, when a distance between a plurality of antennas 412 is calculated as described above, $Ref_i$ ($X_{refi}$, $Y_{refi}$) may be replaced with $Ref_i''$ ($X_{refi}''$, $Y_{refi}''$) for calculation. It should be noted that the first Fresnel zone end position may be a position obtained through multiplication at any percentage such as 60% of a Fresnel radius instead of 100% of the Fresnel radius.

Figure 28:
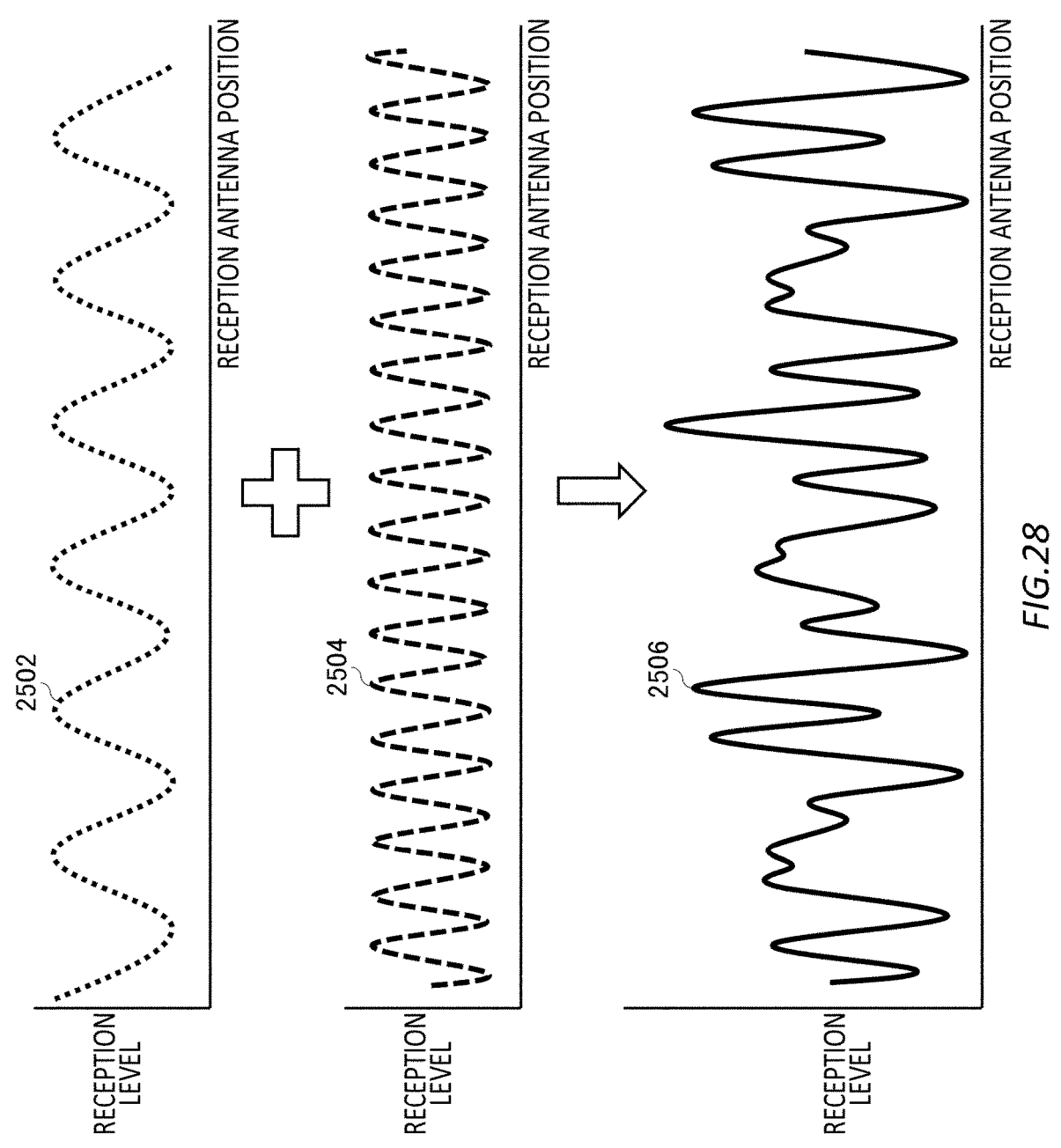
FIG. 28 schematically shows an example of a long period level fluctuation 2502, a short period level fluctuation 2504, and a combined wave level fluctuation 2506.

FIG. 28 schematically shows an example of a long period level fluctuation 2502, a short period level fluctuation 2504, and a combined wave level fluctuation 2506.

Figure 29:
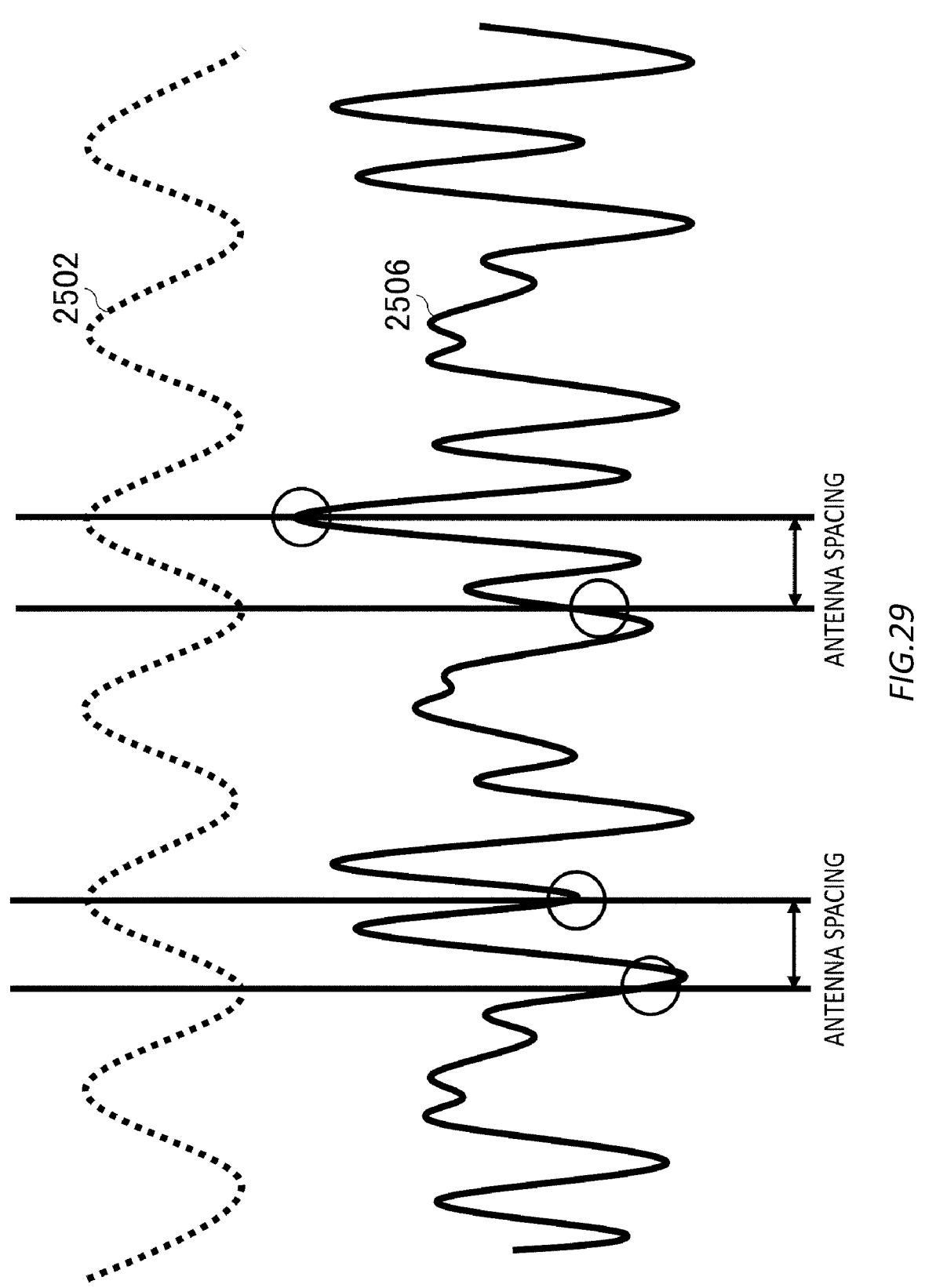
FIG. 29 is an explanatory drawing for illustrating a reception level of a combined wave level fluctuation 2506 for a case where antennas 2412 are arranged in accordance with a half period of a long period level fluctuation 2502.

FIG. 29 is an explanatory drawing for illustrating a reception level of a combined wave level fluctuation 2506 for a case where antennas 2412 are arranged in accordance with a half period of a long period level fluctuation 2502.

If a reflected wave with a different distance between transmission antenna and reflector, or a reflected wave reflected multiple times between reflectors or regular reflection points arrives at a reception antenna for each component, as illustrated in FIG. 28, when a reflected wave causing a reception level fluctuation with a longest period $L_{max}$ is combined with a reflected wave causing a different reception level fluctuation with a small level difference (for example, within 5 dB), a level decreases at a point where the reception level fluctuation with the longest period $L_{max}$ reaches a local maximum. Therefore, with an antenna diversity configuration with an odd multiple of a half period of the longest period $L_{max}$ (2p−1)$L_{max}/2$ (p=1, 2, ... ), the reception level may decrease in both antennas.

Since a fine fluctuation period of a combined wave is a shortest period $L_{min}$ of the reflected wave causing the different reception level fluctuation with the small level difference, with a diversity configuration in which antennas are arranged around by being shifted by a distance equivalent to an odd multiple of a half period of the shortest period $L_{min}$ (2q−1) $L_{min}/2$ (q=1, 2, ... ) in addition to arrangement based on the longest period $L_{max}$, it is possible to prevent the level from simultaneously decreasing in all the antennas and to contribute to improvement of a communication quality.

Figure 30:
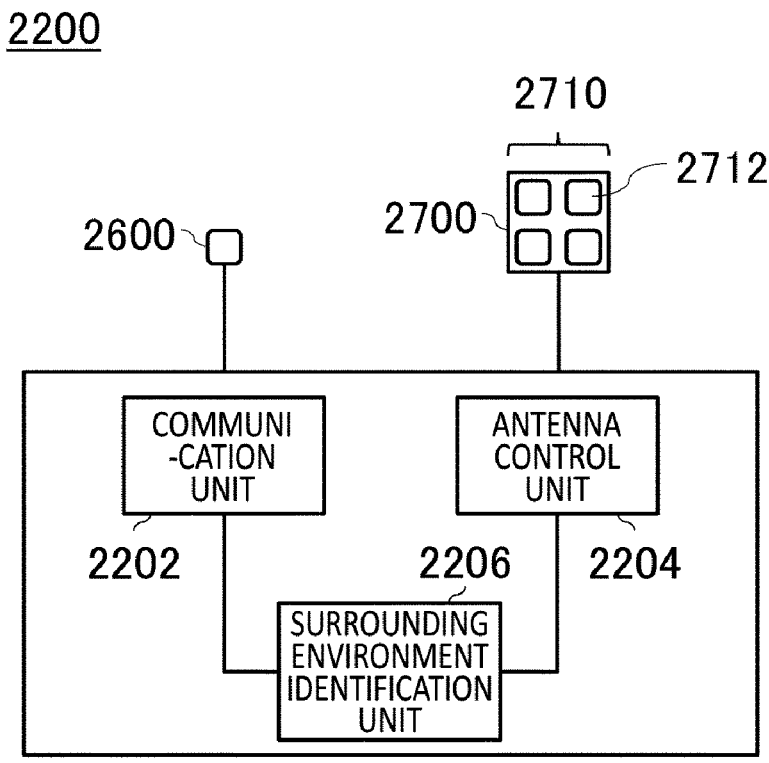
FIG. 30 schematically shows another example of a communication apparatus 2200.

FIG. 30 schematically shows another example of a communication apparatus 2200. The communication apparatus 2200 shown in FIG. 30 performs communication using an antenna 2600 and an antenna unit 2700. The antenna 2600 may be arranged on a front of a vehicle 2100 similarly to an antenna 2300, for example. The antenna unit 2700 may be arranged on a back of the vehicle 2100 similarly to an antenna unit 2400, for example. An antenna array 2710 may include a plurality of antennas 2712.

The communication apparatus 2200 includes a communication unit 2202, an antenna control unit 2204, and a surrounding environment identification unit 2206. The communication unit 2202 performs communication using the antenna 2600 and the antenna unit 2700. In addition, the communication unit 2202 may communicate with a control apparatus of the vehicle 2100 mounted with the communication apparatus 2200. The control apparatus of the vehicle 2100 may include a car navigation system.

The antenna control unit 2204 controls the antenna array 2710. The plurality of antennas 2712 may be configured such that their positions can be changed. The plurality of antennas 2712 may be configured such that their positions can be changed in a lateral direction. The plurality of antennas 2712 may be configured such at their positions can be changed in a longitudinal direction. The plurality of antennas 2712 may be configured such that their positions can be changed in a lateral direction and a longitudinal direction.

The surrounding environment identification unit 2206 identifies a surrounding environment of the vehicle 2100 mounted with the communication apparatus 2200 and a vehicle mounted with a communication partner of the communication apparatus 2200. The surrounding environment identification unit 2206 identifies the surrounding environment, for example, by using map information of a position at which the vehicle 2100 is travelling which is obtained from the control apparatus of the vehicle 2100. The surrounding environment identification unit 2206 identifies the surrounding environment, for example, by using a captured image of surroundings of the vehicle 2100 which is obtained from the control apparatus of the vehicle 2100. The surrounding environment identification unit 2206 may identify presence of a surrounding reflector. Examples of a reflector include a side wall, architectural structures such as a building and a house, another vehicle, a tunnel, and the like.

The antenna control unit 2204 may control positions of the plurality of antennas 2712 on a basis of a result of identification by the surrounding environment identification unit 2206. For example, when the vehicle 2100 enters the tunnel with a plurality of antennas 2412 arranged at default positions and a tunnel inner wall is the reflector, the antenna control unit 2204 controls positions of a plurality of reception antennas such that they are arranged by being shifted by a distance equivalent to an odd multiple of a half period of a fluctuation period of each horizontal and vertical component, assuming that a difference for each component between a plurality of regular reflection positions on the reflector and a position of a transmission antenna of the communication partner is a distance for each component between the transmission antenna and the reflector, and using a value in a region where a fluctuation period is stable. The distance for a shift may be calculated in advance, and the distance for the shift may be maintained. The default positions of the plurality of antennas 2412 may be determined in any manner.

When the result of identification by the surrounding environment identification unit 2206 indicates that a closest reflector in a horizontal direction is the tunnel inner wall and a closest reflector in a vertical direction is a road surface, the antenna control unit 2204 may control positions of the plurality of antennas 2412 such that they are arranged by being shifted by the distance equivalent to the odd multiple of the half period of the fluctuation period of each horizontal and vertical component, assuming that a difference for each horizontal component between the plurality of regular reflection positions on the tunnel inner wall between the transmission antenna of the communication partner and a first reception antenna, and the position of the transmission antenna, is a distance for each horizontal component between the transmission antenna and the tunnel inner wall in a horizontal direction, assuming that a difference for each vertical component between the transmission antenna and the road surface is a distance for each vertical component between the transmission antenna and the road surface in a vertical direction, and using the value in the region where the fluctuation period is stable.

When the result of identification by the surrounding environment identification unit 2206 indicates that the closest reflector in the horizontal direction is another vehicle and the closest reflector in the vertical direction is the tunnel inner wall, the antenna control unit 2204 may control the positions of the plurality of antennas 2412 such that they are arranged by being shifted by the distance equivalent to the odd multiple of the half period of the fluctuation period of each horizontal and vertical component, assuming that a difference for each horizontal component between the transmission antenna of the communication partner and another vehicle is a distance for each horizontal component between the transmission antenna and another vehicle in a horizontal direction, assuming that a difference for each vertical component between the plurality of regular reflection positions on the tunnel inner wall between the transmission antenna and the first reception antenna, and the position of the transmission antenna, is a distance for each vertical component between the transmission antenna and the tunnel inner wall, and using the value in the region where the fluctuation period is stable.

Although the above embodiment has been described using, as an example, a case where there is a single transmission antenna and a plurality of reception antennas, the present invention is not limited thereto, and transmission and reception may be interchanged. That is, the vehicle 2100 may include: an antenna unit for transmission having an antenna array including a plurality of antennas; and one antenna for reception.

Figure 31:
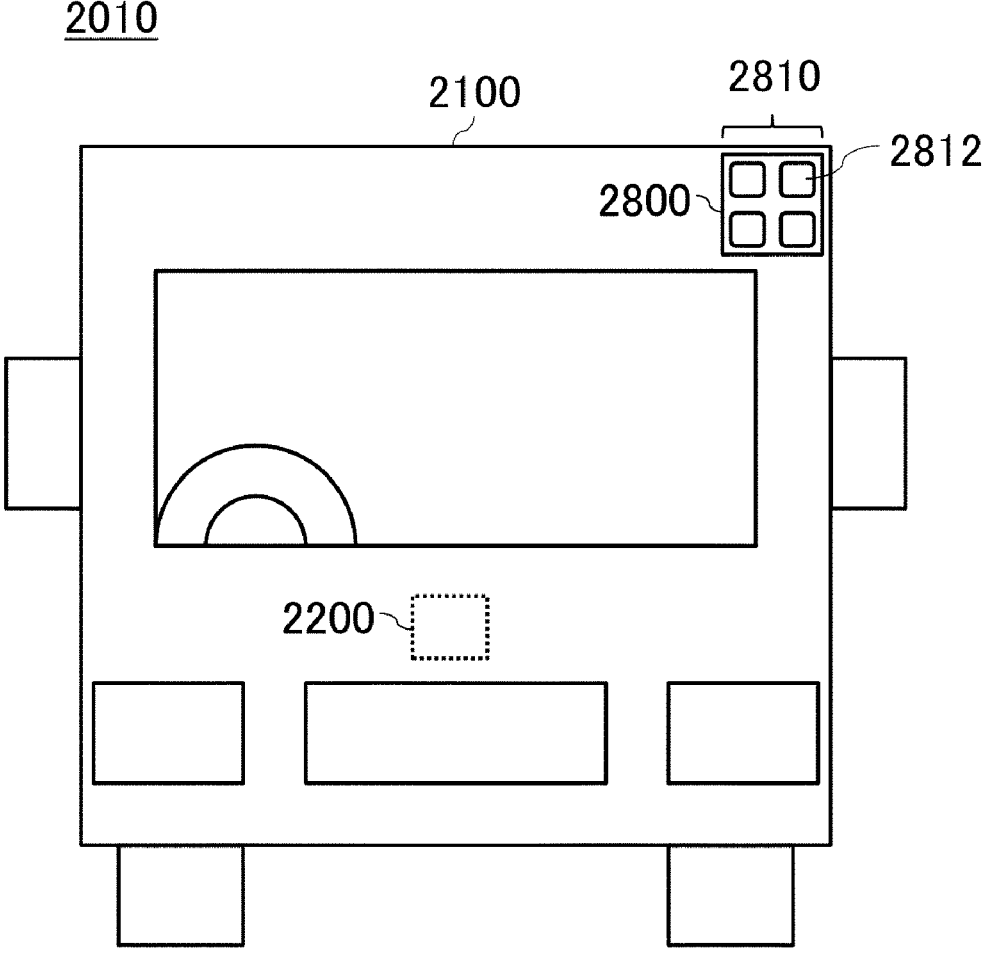
FIG. 31 schematically shows another example of a system 2010.
Figure 32:
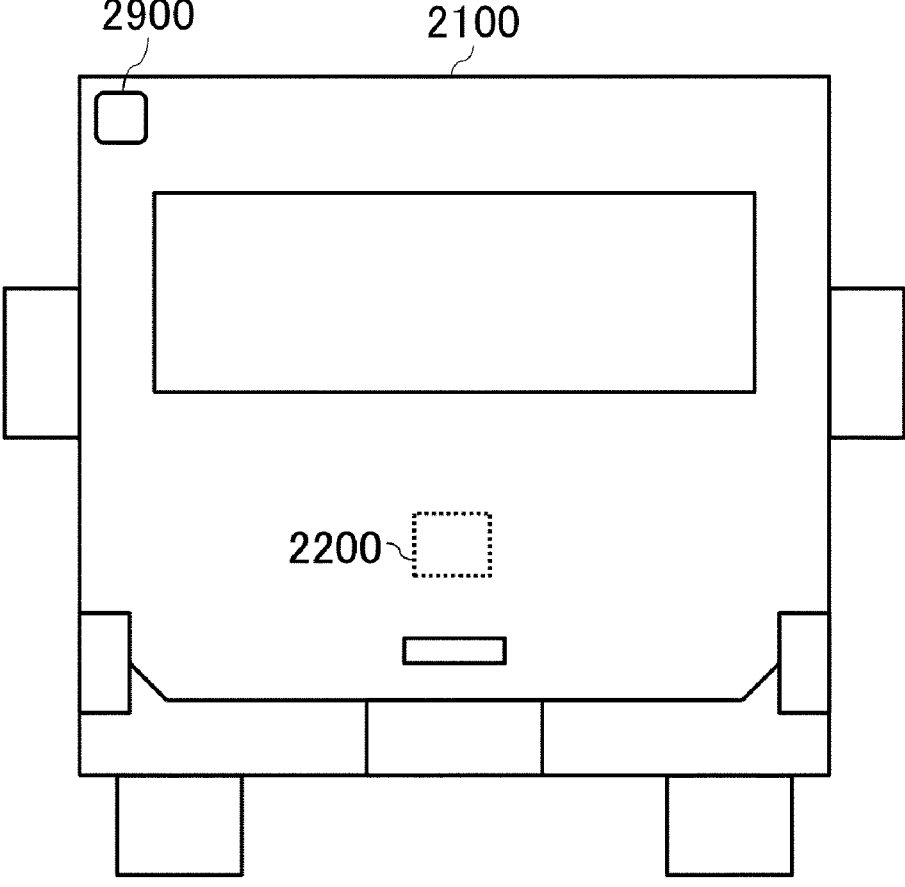
FIG. 32 schematically shows another example of a system 2010.

FIG. 31 and FIG. 32 schematically show another example of a system 2010. Here, differences with the system 2010 shown in FIG. 17 and FIG. 18 will be mainly described. The system 2010 includes a communication apparatus 2200, an antenna unit 2800, and a movable object mounted with the communication apparatus 2200 and the antenna unit 2800. The vehicle 2100 in FIG. 31 and FIG. 32 is an example of the movable object.

FIG. 31 schematically shows a front of the vehicle 2100, and FIG. 32 schematically shows a back of the vehicle 2100. The antenna unit 2800 is arranged on the front of the vehicle 2100. An antenna 2900 is arranged on the back of the vehicle 2100.

The antenna unit 2800 includes an antenna array 2810. FIG. 31 illustrates a case where the antenna unit 2800 has the antenna array 2810 composed of a plurality of antennas 2812. The antenna unit 2800 may be an example of an antenna apparatus. The communication apparatus 2200 including the antenna unit 2800 may be an example of the antenna apparatus.

The communication apparatus 2200 uses the antenna 2900 and the antenna unit 2800 to communicate with a communication apparatus 2200 mounted on another vehicle 2100 which is different from the vehicle 2100 (which may be described as an own vehicle) mounted with the communication apparatus 2200. For example, the communication apparatus 2200 uses the antenna unit 2800 to transmit data to another vehicle 2100 travelling ahead of the own vehicle, and uses the antenna 2900 to receive data from another vehicle 2100 travelling behind the own vehicle. An antenna 2812 may be an example of a transmission antenna, and the antenna 2900 may be an example of a reception antenna.

The plurality of antennas 2812 may be arranged by being shifted by a distance equivalent to an odd multiple of a half period of a fluctuation period of each horizontal and vertical component, assuming that a difference for each component between a plurality of regular reflection positions on a reflector between a reception antenna of a communication partner and a first antenna 2812 of the plurality of antennas 2812, and a position of the reception antenna, is a distance for each component between the reception antenna and the reflector, and using a value in a region where a fluctuation period is stable.

The plurality of antennas 2812 may be arranged by being shifted by a distance calculated assuming that the reflector in a horizontal direction is a tunnel inner wall and that the reflector in a vertical direction is a road surface. For example, the plurality of antennas 2812 may be arranged by being shifted by the distance equivalent to the odd multiple of the half period of the fluctuation period of each horizontal and vertical component, assuming that a difference for each horizontal component between the plurality of regular reflection positions on the tunnel inner wall between the reception antenna of the communication partner and a first transmission antenna, and the position of the reception antenna, is a distance for each horizontal component between the reception antenna and the tunnel inner wall in a horizontal direction, assuming that a difference for each vertical component between the reception antenna and the road surface is a distance for each vertical component between the reception antenna and the road surface in a vertical direction, and using the value in the region where the fluctuation period is stable.

The plurality of antennas 2812 may be arranged by being shifted by a distance calculated assuming that the reflector in the horizontal direction is another vehicle located on a side of the vehicle 2100 and that the reflector in the vertical direction is the tunnel inner wall. For example, the plurality of antennas 2812 may be arranged by being shifted by the distance equivalent to the odd multiple of the half period of the fluctuation period of each horizontal and vertical component, assuming that a difference for each horizontal component between the reception antenna of the communication partner and another vehicle is a distance for each horizontal component between the reception antenna and another vehicle in a horizontal direction, assuming that a difference for each vertical component between the plurality of regular reflection positions on the tunnel inner wall between the reception antenna and the first transmission antenna, and the position of the reception antenna, is a distance for each vertical component between the reception antenna and the tunnel inner wall, and using the value in the region where the fluctuation period is stable.

Figure 33:
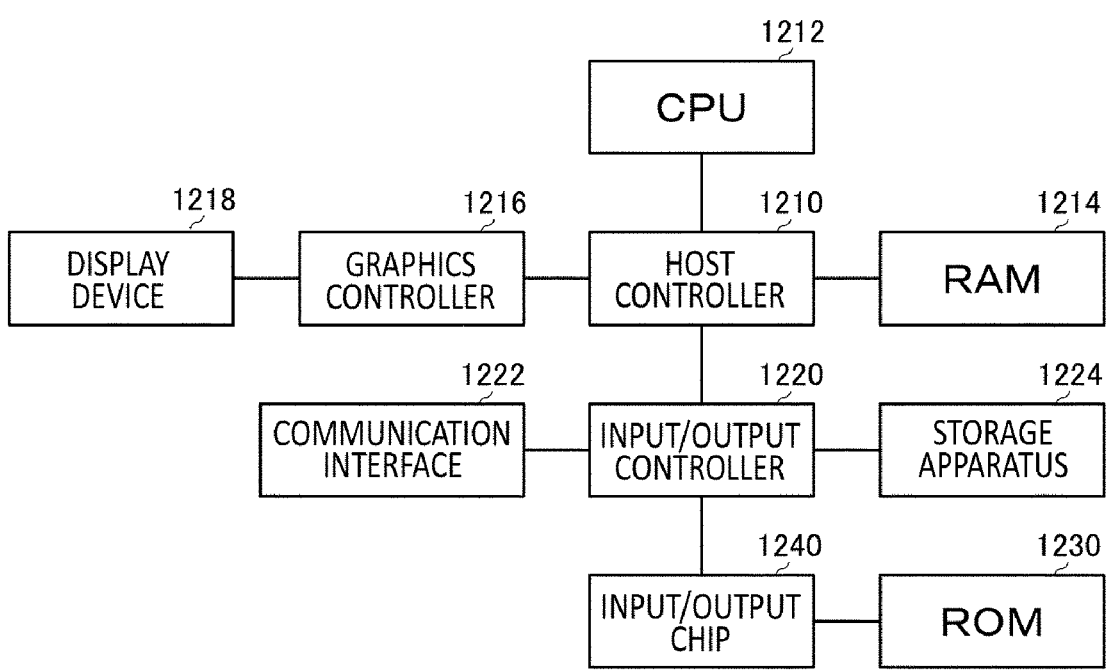
FIG. 33 schematically shows an example of a hardware configuration of a computer 1200 which functions as a communication apparatus 2200.

FIG. 33 schematically shows an example of a hardware configuration of a computer 1200 functioning as a communication apparatus 200. A program installed in the computer 1200 can cause the computer 1200 to function as one or more "units" of an apparatus according to the present embodiment, or cause the computer 1200 to perform operations associated with the apparatus or perform one or more "units" thereof according to the present embodiment, and/or cause the computer 1200 to perform the process according to the present embodiment or perform the steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. The computer 1200 also includes input/output units such as a communication interface 1222, a storage apparatus 1224, a DVD drive and an IC card drive, which are connected to the host controller 1210 via an input/output controller 1220. The DVD drive may be a DVD-ROM drive, a DVD-RAM drive, and the like. The storage apparatus 1224 may be a hard disk drive, a solid state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with another electronic device via a network. The storage apparatus 1224 stores a program and data used by the CPU 1212 in the computer 1200. The DVD drive reads the programs or the data from the DVD-ROM or the like, and provides the storage apparatus 1224 with the programs or the data. The IC card drive reads programs and data from an IC card and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as the DVD-ROM or the IC card. The program is read from the computer readable storage medium, installed into the storage apparatus 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. An apparatus or method may be composed of by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing on a basis of a processing written in the communication program. The communication interface 1222, under control of the CPU 1212, reads transmission data stored on a transmission buffer region provided in a recording medium such as the RAM 1214, the storage apparatus 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage apparatus 1224, the DVD drive (DVD-ROM), the IC card, etc., and perform various types of processing on the data on the RAM 1214. Next, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information search/replacement, or the like described throughout the present disclosure and specified by instruction sequences of the programs, to write the results back to the RAM 1214. In addition, the CPU 1212 may search for information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a specified condition, from among the plurality of entries, and read the attribute value of the second attribute stored in the entry, thereby obtaining the attribute value of the second attribute associated with the first attribute satisfying a predetermined condition.

The above-described program or software modules may be stored in the computer readable storage medium on or near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of apparatuses responsible for performing operations. A specific step and "unit" may be implemented by dedicated circuit, programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and another logical operation, and a flip-flop, a register, and a memory element, such as a field programmable gate array (FPGA) and a programmable logic array (PLA).

The computer readable storage medium may include any tangible device capable of storing an instruction performed by an appropriate device, so that the computer readable storage medium having the instruction stored thereon includes a product including an instruction that may be performed in order to provide means for performing an operation specified by a flowchart or a block diagram. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuit of another programmable data processing apparatus locally or via a local area network (LAN), a wide area network (WAN) such as the Internet or the like in order that the general purpose computer, the special purpose computer, or the processor or the programmable circuit of the another programmable data processing apparatus performs the computer readable instruction to provide means for performing operations specified by the flowchart or the block diagram. Examples of the processor include a computer processor, a processing unit, a microprocessor, a digital signal processor, a controller, a microcontroller, and the like.

Although the above embodiment has shown the vehicle 100 as an example of the movable object, the movable object is not limited there to. Other examples of the movable object include a railroad vehicle, an unmanned aerial vehicle, and the like.

While the present invention has been described by way of the embodiments, the technical scope of the present invention is not limited to the above embodiments. It is apparent to persons skilled in the art that various alterations or improvements can be added to the above embodiments. It is also apparent from the scope of the claims that the embodiments added with such alterations or improvements can be included in the technical scope of the invention.

The operations, procedures, steps, and stages of each process performed by an device, system, program, and method shown in the claims, embodiments, or diagrams can be realized in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 22: wall, 24: wall, 32: direct wave, 34: reflected wave, 36: reflected wave, 42: side vehicle, 44: side vehicle, 46: side vehicle, 48: side vehicle, 100: vehicle, 200: communication apparatus, 202: communication unit, 204: antenna control unit, 206: surrounding environment identification unit, 300: antenna, 400: antenna unit, 410: antenna array, 412: antenna, 414: antenna, 416: antenna, 418: antenna, 420: antenna, 422: antenna, 502: long period level fluctuation, 504: short period level fluctuation, 506: combined wave level fluctuation, 600: antenna, 700: antenna unit, 710: antenna array, 712: antenna, 714: antenna, 800: antenna unit, 810: antenna array, 812: antenna, 814: antenna, 900: antenna, 1200: computer, 1210: host controller, 1212: CPU, 1214: RAM, 1216: graphics controller, 1218: display device, 1220: input/output controller, 1222: communication interface, 1224: storage apparatus, 1230: ROM, 1240: input/output chip, 2010: system, 2100: vehicle, 2200: communication apparatus, 2202: communication unit, 2204: antenna control unit, 2206: surrounding environment identification unit, 2300: antenna, 2400: antenna unit, 2410: antenna array, 2412: antenna, 2502: long period level fluctuation, 2504: short period level fluctuation, 2506: combined wave level fluctuation, 2600: antenna, 2700: antenna unit, 2710: antenna array, 2712: antenna, 2800: antenna unit, 2810: antenna array, 2812: antenna, 2900: antenna.

What is claimed is:

1. An antenna apparatus mounted on a movable object, the antenna apparatus comprising an antenna array including: a plurality of first antennas which are arranged by being shifted by a distance equivalent to an odd multiple of a half period of a maximum fluctuation period of a radio wave having a longest fluctuation period among a plurality of radio waves received from an antenna of a communication partner; and a plurality of second antennas which are respectively arranged by being shifted with respect to the plurality of first antennas by a distance equivalent to an odd multiple of a half period of a minimum fluctuation period of a radio wave having a shortest fluctuation period among the plurality of radio waves.

2. The antenna apparatus according to claim 1, wherein the plurality of first antennas are arranged by being shifted by the distance equivalent to the odd multiple of the half period of the maximum fluctuation period calculated from a minimum value for a distance between the antenna of the communication partner and a reflector.

3. The antenna apparatus according to claim 1, wherein the plurality of second antennas are respectively arranged by being shifted with respect to the plurality of first antennas by the distance equivalent to the odd multiple of the half period of the minimum fluctuation period calculated from respective distances between the antenna of the communication partner and two reflectors in an environment where the antenna apparatus and the communication partner are sandwiched between the two reflectors and from a number of at least one reflection.

4. The antenna apparatus according to claim 1, wherein the plurality of first antennas are arranged by being shifted in a lateral direction by the distance equivalent to the odd multiple of the half period of the maximum fluctuation period calculated from a minimum value for a distance between the antenna of the communication partner and a reflector in an environment where the antenna apparatus and the communication partner are sandwiched between two reflectors located in a lateral direction.

5. The antenna apparatus according to claim 4, wherein the plurality of second antennas are respectively arranged by being shifted in a lateral direction with respect to the plurality of first antennas by the distance equivalent to the odd multiple of the half period of the minimum fluctuation period calculated from respective distances between the antenna of the communication partner and two reflectors located in a lateral direction in an environment where the antenna apparatus and the communication partner are sandwiched between the two reflectors and from a number of at least one reflection.

6. The antenna apparatus according to claim 5, wherein
the antenna apparatus is an antenna apparatus for a vehicle travelling on a road,
the two reflectors are side walls installed on the road,
respective distances between the antenna of the communication partner and the two reflectors are distances corresponding to distances between the antenna of the communication partner and the two reflectors which are assumed when the communication partner travels on the road.

7. The antenna apparatus according to claim 5, wherein
the antenna apparatus is an antenna apparatus for a vehicle travelling on a road,
at least one of the two reflectors is a side vehicle travelling on a side of the vehicle, and
a distance between the antenna of the communication partner and the side vehicle is a distance corresponding to the distance between the antenna of the communication partner and the side vehicle which is assumed when the side vehicle travels on a side of the communication partner.

8. The antenna apparatus according to claim 1, wherein the plurality of first antennas are arranged by being shifted in a longitudinal direction by the distance equivalent to the odd multiple of the half period of the maximum fluctuation period calculated from a minimum value for a distance between the antenna of the communication partner and a reflector in an environment where the antenna apparatus and the communication partner are sandwiched between two reflectors located in a longitudinal direction.

9. The antenna apparatus according to claim 8, wherein the plurality of second antennas are respectively arranged by being shifted in a longitudinal direction with respect to the plurality of first antennas by the distance equivalent to the odd multiple of the half period of the minimum fluctuation period calculated from respective distances between the antenna of the communication partner and two reflectors located in a longitudinal direction in an environment where the antenna apparatus and the communication partner are sandwiched between the two reflectors and from a number of at least one reflection.

10. The antenna apparatus according to claim 9, wherein
the antenna apparatus is an antenna apparatus for a vehicle travelling on a road,
one of the two reflectors is a road, and another of the two reflectors is a roof of a tunnel, and
a distance between the antenna of the communication partner and the road is a distance corresponding to the distance between the antenna of the communication partner and the road which is assumed when the communication partner travels on the road, and a distance between the antenna of the communication partner and the roof is a distance corresponding to the distance between the antenna of the communication partner and the roof which is assumed when the communication partner travels in the tunnel.

11. The antenna apparatus according to claim 1, wherein
the plurality of first antennas are arranged by being shifted in a lateral direction by the distance equivalent to the odd multiple of the half period of the maximum fluctuation period calculated from a minimum value for a distance between the antenna of the communication partner and a reflector in an environment where a plurality of reflectors are located in a lateral direction of the antenna apparatus and the communication partner, and
the plurality of second antennas are respectively arranged by being shifted in a lateral direction with respect to the plurality of first antennas by the distance equivalent to the odd multiple of the half period of the minimum fluctuation period calculated from respective distances between the antenna of the communication partner and the plurality of reflectors in the environment where the plurality of reflectors are located in the lateral direction of the antenna apparatus and the communication partner.

12. The antenna apparatus according to claim 1, wherein
the plurality of first antennas include two first antennas which are arranged by being shifted in a lateral direction by the distance equivalent to the odd multiple of the half period of the maximum fluctuation period calculated from a minimum value for distances between the antenna of the communication partner and two reflectors in a lateral direction in an environment where the antenna apparatus and the communication partner are sandwiched between the two reflectors in the lateral direction,
the plurality of second antennas include two second antennas which are respectively arranged by being shifted in a lateral direction with respect to the two first antennas by the distance equivalent to the odd multiple of the half period of the minimum fluctuation period calculated from respective distances between the antenna of the communication partner and the two reflectors in the lateral direction in the environment where the antenna apparatus and the communication partner are sandwiched between the two reflectors in the lateral direction and from a number of at least one reflection, and the antenna apparatus comprises:

two third antennas which are respectively arranged by being shifted in a longitudinal direction with respect to the two first antennas by the distance equivalent to the odd multiple of the half period of the maximum fluctuation period calculated from a minimum value for a distance between the antenna of the communication partner and a reflector in an environment where the antenna apparatus and the communication partner are sandwiched between two reflectors in a longitudinal direction;

four fourth antennas which are respectively arranged by being shifted in a longitudinal direction with respect to the two first antennas and the two third antennas by the distance equivalent to the odd multiple of the half period of the minimum fluctuation period calculated from respective distances between the antenna of the communication partner and the two reflectors in the longitudinal direction in the environment where the antenna apparatus and the communication partner are sandwiched between the two reflectors in the longitudinal direction and from a number of at least one reflection;

two fifth antennas which are respectively arranged by being shifted in a longitudinal direction with respect to the two second antennas by the distance equivalent to the odd multiple of the half period of the maximum fluctuation period calculated from the minimum value for the distance between the antenna of the communication partner and the reflector in the environment where the antenna apparatus and the communication partner are sandwiched between the two reflectors in the longitudinal direction; and four sixth antennas which are respectively arranged by being shifted in a longitudinal direction with respect to the two second antennas and the two fifth antennas by the distance equivalent to the odd multiple of the half period of the minimum fluctuation period calculated from the respective distances between the antenna of the communication partner and the two reflectors in the longitudinal direction in the environment where the antenna apparatus and the communication partner are sandwiched between the two reflectors in the longitudinal direction and from a number of at least one reflection.

13. The antenna apparatus according to claim 1, wherein the plurality of first antennas include two first antennas which are arranged by being shifted in a lateral direction by the distance equivalent to the odd multiple of the half period of the maximum fluctuation period calculated from a minimum value for distances between the antenna of the communication partner and two reflectors in a lateral direction in an environment where the antenna apparatus and the communication partner are sandwiched between the two reflectors in the lateral direction and two reflectors in a longitudinal direction and which are arranged by being shifted in a longitudinal direction by the distance equivalent to the odd multiple of the half period of the maximum fluctuation period calculated from a minimum value for distances between the antenna of the communication partner and the two reflectors in the longitudinal direction in the environment, and the plurality of second antennas include two second antennas which are respectively arranged by being shifted in a lateral direction with respect to the two first antennas by the distance equivalent to the odd multiple of the half period of the minimum fluctuation period calculated from respective distances between the antenna of the communication partner and the two reflectors in the lateral direction in the environment where the antenna apparatus and the communication partner are sandwiched between the two reflectors in the lateral direction and the two reflectors in the longitudinal direction and from a number of at least one reflection and which are respectively arranged by being shifted in a longitudinal direction with respect to the two first antennas by the distance equivalent to the odd multiple of the half period of the minimum fluctuation period calculated from respective distances between the antenna of the communication partner and the two reflectors in the longitudinal direction in the environment and from a number of at least one reflection.

14. An antenna apparatus mounted on a movable object, the antenna apparatus comprising an antenna array including: a plurality of first antennas which are arranged by being shifted by a distance equivalent to an odd multiple of a half period of a maximum fluctuation period of a radio wave having a longest fluctuation period among a plurality of radio waves transmitted by the antenna apparatus and received by a communication partner; and a plurality of second antennas which are respectively arranged by being shifted with respect to the plurality of first antennas by a distance equivalent to an odd multiple of a half period of a minimum fluctuation period of a radio wave having a shortest fluctuation period among the plurality of radio waves.

15. A system comprising:

the antenna apparatus according to claim 1; and the movable object.

16. A communication apparatus mounted on a movable object, the communication apparatus comprising:

an antenna array including a plurality of first antennas and a plurality of second antennas;

a surrounding environment identification unit which identifies a surrounding environment of the movable object mounted with the communication apparatus and a movable object mounted with a communication partner of the communication apparatus; and an antenna control unit which controls positions of the plurality of first antennas and the plurality of second antennas such that the plurality of first antennas are shifted by a distance equivalent to an odd multiple of a half period of a maximum fluctuation period of a radio wave having a longest fluctuation period among a plurality of radio waves received from an antenna of the communication partner by a first antenna and that the plurality of second antennas are respectively shifted with respect to the plurality of first antennas by a distance equivalent to an odd multiple of a half period of a minimum fluctuation period of a radio wave having a shortest fluctuation period among the plurality of radio waves, on a basis of a result of identification by the surrounding environment identification unit.

17. A communication apparatus mounted on a movable object, the communication apparatus comprising:

an antenna array including a plurality of first antennas and a plurality of second antennas;

a surrounding environment identification unit which identifies a surrounding environment of the movable object mounted with the communication apparatus and a movable object mounted with a communication partner of the communication apparatus; and an antenna control unit which controls positions of the plurality of first antennas and the plurality of second antennas such that the plurality of first antennas are shifted by a distance equivalent to an odd multiple of a half period of a maximum fluctuation period of a radio wave having a longest fluctuation period among a plurality of radio waves transmitted by a first antenna and received by an antenna of the communication partner and that the plurality of second antennas are respectively shifted with respect to the plurality of first antennas by a distance equivalent to an odd multiple of a half period of a minimum fluctuation period of a radio wave having a shortest fluctuation period among the plurality of radio waves, on a basis of a result of identification by the surrounding environment identification unit.

18. A non-transitory computer readable storage medium having stored thereon a program that causes a computer to function as a communication apparatus mounted on a movable object, the communication apparatus comprising:

an antenna array including a plurality of first antennas and a plurality of second antennas;

a surrounding environment identification unit which identifies a surrounding environment of the movable object mounted with the communication apparatus and a movable object mounted with a communication partner of the communication apparatus; and an antenna control unit which controls positions of the plurality of first antennas and the plurality of second antennas such that the plurality of first antennas are shifted by a distance equivalent to an odd multiple of a half period of a maximum fluctuation period of a radio wave having a longest fluctuation period among a plurality of radio waves received from an antenna of the communication partner by a first antenna and that the plurality of second antennas are respectively shifted with respect to the plurality of first antennas by a distance equivalent to an odd multiple of a half period of a minimum fluctuation period of a radio wave having a shortest fluctuation period among the plurality of radio waves, on a basis of a result of identification by the surrounding environment identification unit.

19. A non-transitory computer readable storage medium having stored thereon a program that causes a computer to function as a communication apparatus mounted on a movable object, the communication apparatus comprising:

an antenna array including a plurality of first antennas and a plurality of second antennas;

a surrounding environment identification unit which identifies a surrounding environment of the movable object mounted with the communication apparatus and a movable object mounted with a communication partner of the communication apparatus; and an antenna control unit which controls positions of the plurality of first antennas and the plurality of second antennas such that the plurality of first antennas are shifted by a distance equivalent to an odd multiple of a half period of a maximum fluctuation period of a radio wave having a longest fluctuation period among a plurality of radio waves transmitted by a first antenna and received by an antenna of the communication partner and that the plurality of second antennas are respectively shifted with respect to the plurality of first antennas by a distance equivalent to an odd multiple of a half period of a minimum fluctuation period of a radio wave having a shortest fluctuation period among the plurality of radio waves, on a basis of a result of identification by the surrounding environment identification unit.

20. An antenna apparatus mounted on a movable object, the antenna apparatus comprising an antenna array having a plurality of reception antennas, wherein the plurality of reception antennas are arranged by being shifted by a distance equivalent to an odd multiple of a half period of a fluctuation period of each horizontal and vertical component, assuming that a difference for the horizontal component and the vertical component between a plurality of regular reflection positions on a reflector between a transmission antenna of a communication partner and a first reception antenna of the plurality of reception antennas, and a position of the transmission antenna, is a distance for the horizontal component and the vertical component between the transmission antenna and the reflector, and using a value in a region where a fluctuation period is stable.

21. The antenna apparatus according to claim 20, wherein the reflector is a tunnel inner wall, and the regular reflection positions are calculated on a basis of dimensions of any tunnel of a plurality of tunnels.

22. The antenna apparatus according to claim 20, wherein the reflector is a tunnel inner wall, and the regular reflection positions are calculated on a basis of an average value for dimensions of a plurality of tunnels.

23. The antenna apparatus according to claim 20, wherein the movable object is a vehicle, the reflector in a horizontal direction is a tunnel inner wall, the reflector in a vertical direction is a road surface, and the plurality of reception antennas are arranged by being shifted by a distance equivalent to an odd multiple of a half period of a fluctuation period of each horizontal and vertical component, assuming that a difference for each horizontal component between a plurality of regular reflection positions on a tunnel inner wall between the transmission antenna of the communication partner and the first reception antenna, and the position of the transmission antenna, is a distance for each horizontal component between the transmission antenna and the tunnel inner wall in a horizontal direction, assuming that a difference for each vertical component between the transmission antenna of the communication partner and a road surface is a distance for each vertical component between the transmission antenna and the road surface in a vertical direction, and using a value in a region where a fluctuation period is stable.

24. The antenna apparatus according to claim 20, wherein the movable object is a vehicle, the reflector in a horizontal direction is another vehicle located on a side of the movable object, the reflector in a vertical direction is a tunnel inner wall, and the plurality of reception antennas are arranged by being shifted by a distance equivalent to an odd multiple of a half period of a fluctuation period of each horizontal and vertical component, assuming that a difference for each horizontal component between the transmission antenna of the communication partner and the another vehicle is a distance for each horizontal component between the transmission antenna and the another vehicle in a horizontal direction, assuming that a difference for each vertical component between a plurality of regular reflection positions on a tunnel inner wall between the transmission antenna of the communication partner and the first reception antenna, and the position of the transmission antenna, is a distance for each vertical component between the transmission antenna and the tunnel inner wall, and using a value in a region where a fluctuation period is stable.

25. The antenna apparatus according to claim 20, wherein the plurality of reception antennas are arranged by being shifted by a distance equivalent to an odd multiple of a half period of a fluctuation period of each horizontal and vertical component, assuming that the difference for the horizontal component and the vertical component between the plurality of regular reflection positions on the reflector between the transmission antenna of the communication partner and the first reception antenna, and the position of the transmission antenna, is the distance for the horizontal component and the vertical component between the transmission antenna and the reflector, and using a mode value of the horizontal component and the vertical component.

26. The antenna apparatus according to claim 20, wherein the plurality of reception antennas are arranged by being shifted by a distance equivalent to an odd multiple of a half period of a fluctuation period of each horizontal and vertical component, assuming that the difference for the horizontal component and the vertical component between the plurality of regular reflection positions on the reflector between the transmission antenna of the communication partner and the first reception antenna, and the position of the transmission antenna, is the distance for the horizontal component and the vertical component between the transmission antenna and the reflector, and using a median value of the horizontal component and the vertical component.

27. The antenna apparatus according to claim 20, wherein the plurality of reception antennas are arranged by being shifted by a distance equivalent to an odd multiple of a half period of a fluctuation period of each horizontal and vertical component $((2j+1)\lambda d/2|X_{ref0}-X_{TX0}|, (2k+1)\lambda d/2|Y_{ref0}-Y_{TX0}|)$, assuming that the difference for the horizontal component and the vertical component between the plurality of regular reflection positions on the reflector between the transmission antenna of the communication partner and the first reception antenna $(X_{refi}, Y_{refi})$, and the position of the transmission antenna $(X_{TX0}, Y_{TX0})$, is the distance for the horizontal component and the vertical component between the transmission antenna and the reflector $(|X_{refi}-X_{TX0}|, |Y_{refi}-Y_{TX0}|)$, and using the value in the region where the fluctuation period calculated using a distance between the movable object and the communication partner as well as a working frequency $$(\lambda d/2|X_{refi} - X_{TX0}|, \lambda d/2|Y_{refi} - Y_{TX0}|)$$

is stable $(\lambda d/2|X_{ref0} - X_{TX0}|, \lambda d/2 | Y_{ref0} - Y_{TX0}|)$.

28. An antenna apparatus mounted on a movable object, the antenna apparatus comprising
an antenna array having a plurality of transmission antennas, wherein
the plurality of transmission antennas are arranged by being shifted by a distance equivalent to an odd multiple of a half period of a fluctuation period of each horizontal and vertical component, assuming that a difference for the horizontal component and the vertical component between a plurality of regular reflection positions on a reflector between a reception antenna of a communication partner and a first transmission antenna of the plurality of transmission antennas, and a position of the reception antenna, is a distance for the horizontal component and the vertical component between the reception antenna and the reflector, and using a value in a region where a fluctuation period is stable.

29. A system comprising:
the antenna apparatus according to claim 20; and
the movable object.

30. A communication apparatus mounted on a movable object, the communication apparatus comprising:
an antenna array having a plurality of reception antennas;
a surrounding environment identification unit which identifies a surrounding environment of the movable object mounted with the communication apparatus and a movable object mounted with a communication partner of the communication apparatus, the surrounding environment identification unit identifying a reflector between the movable object and the communication partner; and
an antenna control unit which controls positions of the plurality of reception antennas such that they are arranged by being shifted by a distance equivalent to an odd multiple of a half period of a fluctuation period of each horizontal and vertical component, assuming that a difference for the horizontal component and the vertical component between a plurality of regular reflection positions on the reflector and a position of a transmission antenna of the communication partner is a distance for the horizontal component and the vertical component between the transmission antenna and the reflector, and using a value in a region where a fluctuation period is stable.

31. A communication apparatus mounted on a movable object, the communication apparatus comprising:
an antenna array having a plurality of transmission antennas;
a surrounding environment identification unit which identifies a surrounding environment of the movable object mounted with the communication apparatus and a movable object mounted with a communication partner of the communication apparatus, the surrounding environment identification unit identifying a reflector between the movable object and the communication partner; and
an antenna control unit which controls positions of the plurality of transmission antennas such that they are arranged by being shifted by a distance equivalent to an odd multiple of a half period of a fluctuation period of each horizontal and vertical component, assuming that a difference for the horizontal component and the vertical component between a plurality of regular reflection positions on the reflector and a position of a reception antenna of the communication partner is a distance for the horizontal component and the vertical component between the reception antenna and the reflector, and using a value in a region where a fluctuation period is stable.

32. A non-transitory computer readable storage medium having stored thereon a program that causes a computer to function as a communication apparatus mounted on a movable object, the communication apparatus comprising:
an antenna array having a plurality of reception antennas;
a surrounding environment identification unit which identifies a surrounding environment of the movable object mounted with the communication apparatus and a movable object mounted with a communication partner of the communication apparatus, the surrounding environment identification unit identifying a reflector between the movable object and the communication partner; and an antenna control unit which controls positions of the plurality of reception antennas such that they are arranged by being shifted by a distance equivalent to an odd multiple of a half period of a fluctuation period of each horizontal and vertical component, assuming that a difference for the horizontal component and the vertical component between a plurality of regular reflection positions on the reflector and a position of a transmission antenna of the communication partner is a distance for the horizontal component and the vertical component between the transmission antenna and the reflector, and using a value in a region where a fluctuation period is stable.

33. A non-transitory computer readable storage medium having stored thereon a program that causes a computer to function as a communication apparatus mounted on a movable object, the communication apparatus comprising:

an antenna array having a plurality of transmission antennas;

a surrounding environment identification unit which identifies a surrounding environment of the movable object mounted with the communication apparatus and a movable object mounted with a communication partner of the communication apparatus, the surrounding environment identification unit identifying a reflector between the movable object and the communication partner; and an antenna control unit which controls positions of the plurality of transmission antennas such that they are arranged by being shifted by a distance equivalent to an odd multiple of a half period of a fluctuation period of each horizontal and vertical component, assuming that a difference for the horizontal component and the vertical component between a plurality of regular reflection positions on the reflector and a position of a reception antenna of the communication partner is a distance for the horizontal component and the vertical component between the reception antenna and the reflector, and using a value in a region where a fluctuation period is stable.

* * * * *